United States Patent [19]
Townsley et al.

[11] Patent Number: 5,666,006
[45] Date of Patent: Sep. 9, 1997

[54] CIRCUIT OFFERING SEQUENTIAL DISCHARGE AND SIMULTANEOUS CHARGE FOR A MULTIPLE BATTERY SYSTEM AND METHOD FOR CHARGING MULTIPLE BATTERIES

[75] Inventors: David B. Townsley, Cupertino; James J. Blanc, San Mateo, both of Calif.

[73] Assignee: Apple Computer, Inc., Cupertino, Calif.

[21] Appl. No.: 241,594

[22] Filed: May 12, 1994

[51] Int. Cl.⁶ .................................................. H02J 7/18
[52] U.S. Cl. ..................... 307/66; 364/273; 364/273.1; 364/273.2; 364/273.3; 364/273.4; 364/273.5; 320/2; 320/14; 320/15; 307/43
[58] Field of Search ............................ 307/66, 43, 86, 307/50, 60, 64; 364/273, 273.1, 273.2, 273.3, 273.4, 273.5, 707; 320/2, 14, 15, 5, 8, 19

[56] References Cited

U.S. PATENT DOCUMENTS

| | | | |
|---|---|---|---|
| 3,108,192 | 10/1963 | Reich . | |
| 4,140,957 | 2/1979 | Rapp . | |
| 4,323,788 | 4/1982 | Smith | 307/66 |
| 4,673,826 | 6/1987 | Masson | 307/66 |
| 5,028,806 | 7/1991 | Stewart et al. . | |
| 5,122,722 | 6/1992 | Goedken et al. | 320/22 |
| 5,200,685 | 4/1993 | Sakamoto . | |
| 5,237,258 | 8/1993 | Crampton . | |
| 5,243,269 | 9/1993 | Katayama et al. | 320/14 |
| 5,270,946 | 12/1993 | Shibasaki et al. . | |
| 5,287,053 | 2/1994 | Hutchinson . | |
| 5,300,874 | 4/1994 | Shimamoto et al. . | |
| 5,349,535 | 9/1994 | Gupta | 364/483 |
| 5,396,163 | 3/1995 | Nor et al. | 320/21 |

FOREIGN PATENT DOCUMENTS

| | | |
|---|---|---|
| 0463593 | 1/1991 | European Pat. Off. . |
| 0450145 | 10/1991 | European Pat. Off. . |
| 9308662 | 10/1993 | Germany . |

*Primary Examiner*—William M. Shoop, Jr.
*Assistant Examiner*—Albert W. Paladini
*Attorney, Agent, or Firm*—Blakely, Sokoloff, Taylor & Zafman

[57] ABSTRACT

A circuit enabling simultaneous independent charging, sequential charging and sequential discharging of multiple batteries within a computer system and a method for charging the batteries independent of their technology or chemistry. Each battery of the multiple batteries in incorporated within a battery pack. The battery pack includes at least the battery, but may also include a module for supplying information regarding the battery to a system micro-controller unit to assist the system micro-controller unit in charging of the battery. For such battery packs, the method for charging each battery, regardless of its technology or chemistry and without hardware modification or software downloading of information, includes a monitoring phase, a charging phase and an error phase.

35 Claims, 20 Drawing Sheets

CIRCUIT OFFERING SEQUENTIAL DISCHARGE AND SIMULTANEOUS CHARGE FOR A MULTIPLE BATTERY SYSTEM AND METHOD FOR CHARGING MULTIPLE BATTERIES

BACKGROUND OF THE INVENTION

1. Field of the Invention

The present invention relates to the field of computers. More particularly, this invention relates to a battery switching circuit enabling simultaneous charging, sequential charging and sequential discharging of multiple batteries and a method for charging the batteries independent of their technology.

2. Art Related to the Present Invention

Over the last few years, portable computers have become one of the fastest growing computer-related products due to its versatility. For example, a portable computer may be used as a personal desktop computer when alternating current ("AC") power is available. In addition, portable computers may be used in "mobile" locations without AC power such as within a vehicle of transport, a job-site outside one's office and a variety of other locations. During use in such location, portable computers generally relay on their removable battery pack(s) for power.

A removable battery pack(s) having sufficient power storage capabilities is essential for portable computers since a portable computer must be able to continuously operate for a reasonable amount of time. Typically, a portable computer is designed with one removable battery pack since it is less costly to manufacture i.e., it requires less contacts, battery pack enclosures, and other components than portable computers having multiple battery packs. However, portable computers having a single battery pack are less expandable and less configurable than portable computers with multiple battery packs since the single battery pack always needs to be present in "mobile" locations and a second battery pack may be used for adding more battery capacity (hence, more run time) or for expanding functionality of the portable computer with a system bus expansion connector at this location. In addition, the user is usually incapable of accurately predicting how much battery run-time remains in the battery, lessening his or her sense of security when using the portable computer as a mobile unit.

Although conventional portable computers having duel removable battery packs are commercially available, these portable computers do not truly offer independent control of discharging and charging of the batteries, limiting benefits and flexibility in using such portable computers. Instead, they normally provide a rudimentary power distribution system, normally without software control, to minimally control the discharging as well as the charging of the batteries. The manner of discharge is usually simultaneous discharging of the batteries. As a result, the cost in designing and constructing the power distribution system is nominal. Although this feature may initially afford its consumers cost savings, there exists many disadvantages which greatly overshadow such savings.

One notable disadvantage is that consumers of portable computers having simultaneous discharging batteries are usually less capable of predicting when to change the batteries or when to charge them. As a result, the consumer may unknowingly over-discharge and possible degrade the batteries or refrain from charging the batteries when needed.

Another notable disadvantage is that the conventional portable computers are not able to reliably charge one battery while still operating at a maximum rate. Rather, the conventional portable computers need to operate in a mode having a slow operational speed or discontinue operations altogether to charge the batteries. Yet another disadvantage prevalent in the conventional power distribution system is that both batteries are almost never fully discharged since the portable computer will often drop into a low power of shutdown mode to avoid losing data or deeply discharging which damages the batteries. By not allowing full discharge of batteries, the batteries are more likely to develop "memory effects," where the batteries appear to lose capacity.

In addition, the conventional portable computers usually require its consumer to download additional software or modify hardware in the event that another battery technology, different from an originally intended technology, is used by the portable computer. For example, most battery packs used by conventional portable comprises Nickel Cadmium ("NiCad") and Nickel Metal Hydride ("NiMH") batteries (hereinafter collectively referred to as "Nickel batteries") which require a constant current regime for charging and follow a well-known negative change in voltage technique (NiCad) or well-known temperature gradient technique (NiMH) to ascertain when to terminate its charging. In the event that the consumer substitutes the Nickel batteries for a Lithium-Ion ("Li-Ion") battery, requiring a constant voltage regime and utilizing a well-known voltage detection and charging time-out technique to ascertain when to terminate its charging, it is likely that the consumer would have to at least upgrade its software and/or hardware to properly charge the Li-Ion battery. The present invention, however, provides an ability to charge or discharge any battery technology through a single battery charging algorithm without any modifications by the consumer.

SUMMARY AND OBJECTS OF THE INVENTION

In light of the foregoing disadvantages existing in conventional portable computers, it is appreciated that there exists a need for multiple battery switching circuit which enables simultaneous charging and sequential discharging of each battery or battery pack as well as a method for controlling the charging of the batteries within the battery packs independent of their technology. Hence, it is an object of the present invention to provide a battery switching circuit which supports simultaneous charging of the battery packs during particular modes of operation.

Another object of the present invention is to provide battery switching circuit which supports sequential discharging of the battery packs during particular modes of operation.

Yet another object of the present invention is to provide a battery switching circuit which supports a dual battery pack computer system.

It is another object of the present invention to provide a battery switching circuit which can disable current leakage from the batteries which may cause the batteries to over-discharge and become degraded.

It is another object of the present invention to provide a battery switching circuit which enables power to be supplied by one battery pack to a computer circuitry while still allowing the user to remove the other battery pack.

It is still another object of the present invention to provide a battery switching circuit which supports any combination of battery types.

Another object of the present invention is to provide a battery pack including a battery for alternatively supplying power to components with the computer system and a module for providing information about the battery for charging purposes.

These and other objects of the present invention are provided by a battery switching a circuit for supplying power to a plurality of components within a computer system through a main power line. The battery switching circuit comprises a plurality of switches positioned on a first and second power lines to allow simultaneous or sequential charging of and sequential discharging of power from each battery within a plurality of battery packs coupled to the battery switching circuit. The first power line is primarily dedicated to providing power to the plurality of components through the main power line when a power source is coupled to the first power line and a first switch of the battery switching circuit is enabled. The first power line is coupled to the main power line at node A.

The second power line, primarily dedicated to charging of the batteries, is divided into a first battery power line and a second battery power line. Both of first and second battery power line are coupled to each other and the main power line at node A. The first battery power line couples a first battery to the main power line as possibly to a second adapter power line of the external power source. The first battery is coupled between a second and third switches, wherein the second switch is coupled to the second battery power line while a third switch is coupled to the main power line at node A. Similarly, the second battery power line is coupled to a second battery coupled between a fourth and fifth switches. The fourth switch is coupled to the first battery power line while a fifth switch is coupled to the main power line at node A. A system micro-controller unit senses for a voltage on either the first and second power lines and enables or disables the first through fifth switches to appropriately allocate power through the battery switching circuit and charge one or both of the batteries if needed.

As an alternative embodiment, each of the plurality of battery packs may include a monitoring circuitry for measuring certain characteristics of the battery and a module for providing the system micro-controller information (i.e., the characteristics) concerning the battery within the corresponding battery pack to assist the micro-controller in ascertaining which switches are enabled or disabled for charging purposes.

The system micro-controller follows a single process for charging any chemistry of battery coupled to the computer system. This process comprises three phases; namely, a monitoring phase, a charging phase and an error phase. The monitoring phase determine whether the battery requires charging by a power source. The charging phase includes three sub-phases; namely, an initial charge sub-phase, a bulk charge sub-phase and a pulse maintenance charge sub-phase. The initial charge sub-phase ascertains whether the battery is shorted. Moreover, the bulk charge sub-phase checks whether it is desirable for the battery to be charged, and if so, performs such charging until detection of a charge termination condition. Finally, the pulse maintenance charge sub-phase maintains the battery at desired a energy level. The error phase simply monitors whether an error condition occurs in either the monitoring phase or the charging phase.

Since the single process for charging may be used on any battery chemistry of at least NiCad, NiMH or Li-Ion batteries and the battery switching circuit allows simultaneous charging of two batteries independently from each other regardless of their charge phase or when they terminate charging, two different battery chemistries may be charged simultaneously with the present invention. The battery characteristics (i.e. information) located within the battery pack allows the user to upgrade the battery type or chemistry by merely inserting the new battery pack. The system micro-controller can automatically obtain the necessary information to perform the proper battery charging process from the new battery pack itself.

BRIEF DESCRIPTION OF THE DRAWINGS

The objects, features and advantages of the present invention will become apparent from the following detailed description of the present invention in which.

DETAILED DESCRIPTION OF THE PRESENT INVENTION

A battery switching circuit for enabling simultaneous independent charging, sequential (staggered) charging and sequential discharging of the batter packs, more particularly a battery within each batter pack, and various methods for controlling the charging of the batteries coupled to the battery switching circuit are described in detail. In a first portion of the following description, specific details such as the battery switching circuit configuration, operational examples of the battery switching circuit, method for controlling charging of the battery packs and the like are set forth in order to provide a thorough understanding of the battery switching circuit. This configuration and examples should not be construed as a limitation on the scope of the present invention since it is apparent that one skilled in the art may practice the present invention without these specific details. In other instances, well-known circuitry is not shown in order to avoid obscuring the present invention.

A second portion of the description describes the battery switching circuit coupled to a battery within an "intelligent" battery pack. The description regarding the charging of the battery within the intelligent battery packs is presented largely in terms of processes outlining certain charging phases of the batteries within the computer system. A process is generally conceived as a self-consistent sequence of steps leading to a desired result. These steps require physical manipulation of physical quantities. Usually, but not necessarily, these quantities are electrical or magnetic signals, conveniently referred to as "bits" which are capable of being stored, transferred, compared, combined or otherwise manipulated. These processes are the means used by those skilled in the art to most effectively convey the present invention. By using an intelligent battery pack with the battery charging presented below, battery chemistry independent charging is enabled by the battery characteristics that is read by a system micro-controller unit ("SMC") directly from the intelligent battery pack.

Figure 1:
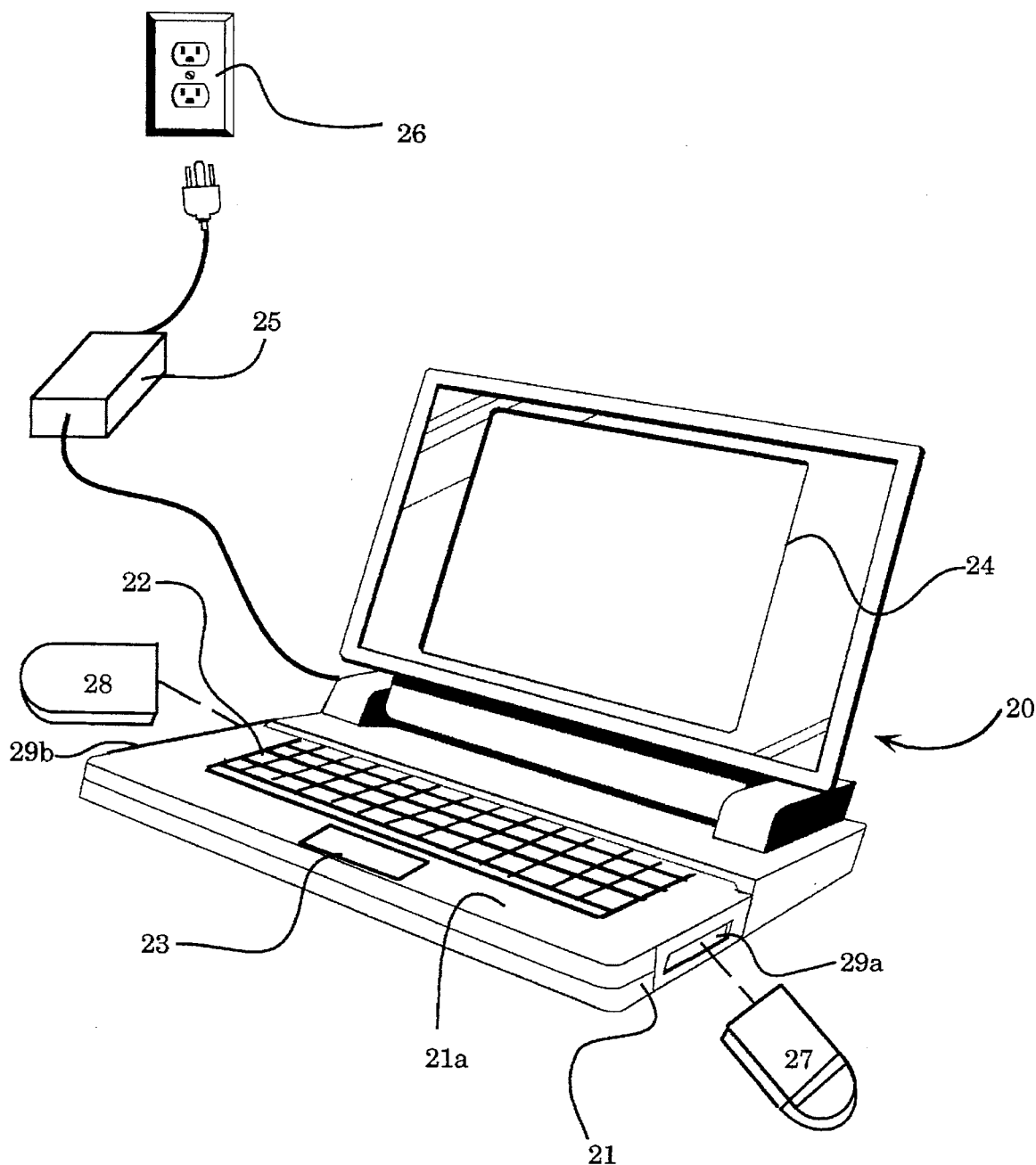
FIG. 1 is a prospective view of the computer system employing the present invention.

Referring to FIG. 1, an embodiment of a computer system 20 utilizing the present invention is illustrated. The computer system 20 generally comprises a main computer casing 21 incorporating conventional components such as, for example, a central processing unit ("CPU"), a memory unit ("MU") as well as a system micro-controller unit ("SMC") to allocate power through certain power lines within the computer system 20 based on a chosen power mode hierarchy (e.g., primary modes like "Run," "Sleep" and "Shutdown"). For example, if the computer system is receiving power from an external power source, the SMC precludes the batteries from supplying power to the computer system, unless battery discharge is desired to avoid "memory effects".

The computer system 20 further comprises an alphanumeric keyboard 22 and a cursor control device 23 such as a touch pad or track ball which are integrally constructed on a top surface 21a of the main computer casing 21 for easy access by a user. A display 24, typically a liquid crystal display or any conventional flat panel display in association with its display circuitry, is pivotally couple dot the main computer casing 21. The computer system 20 receives power from either (i) an external power source such as an external alternating current-to-direct current ("AC-to-DC") power adapter 25 coupled to a power supply 26 (e.g., a wall socket supplying 110 volts AC) to provide DC power to the computer system 20, or (ii) at least one of preferably two battery packs 27 and 28 connected to the computer system through a first and second battery bay 29a and 29b. It is contemplated that an alternative configuration may include a single battery pack upgradable to two battery packs with an option of including a system or feature expansion card for memory, graphics, processors, etc. in the other battery bay.

Figure 2:
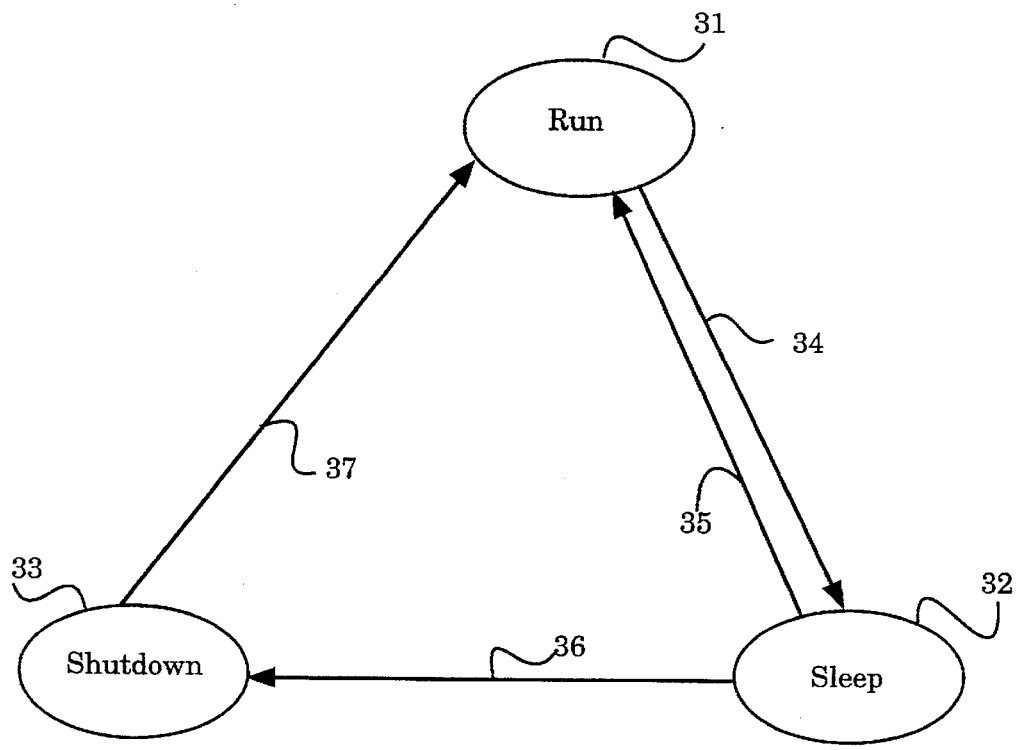
FIG. 2 is a state diagram of illustrating the primary power modes supported by the computer system.

Referring now to FIG. 2, a state diagram of a selected power mode hierarchy of the computer system is illustrated. This particular hierarchy assists in explaining various primary modes of power usage which may be experienced by the computer system during operation, and should not be construed as a limitation on available power mode hierarchies. In this hierarchy, the computer system may exist at any time in one of three primary power modes (i.e., "Run," "Sleep" or "Shutdown") denoted by circles 31–33. The computer system exists in Run mode 31 when fully operational and powered by the AC-to-DC adapter or by one of the batteries. The computer system 20 exists in the Run mode 31 until one of a number of events causes the computer system to enter into another mode. For example, as shown in FIG. 2, a transition 34 from Run mode 31 to Sleep mode 32 occurs upon detection by system software of one of a number of events such as "Sleep" menu selection by the user, system inactivity for a certain time period or detection that battery power is below a certain threshold level.

The Sleep mode 32 is entered into upon detection of one of a variety of events in order to preserve power to more critical components such as system memory, a real-time clock within the SMC and a configuration file residing in parameter RAM of the SMC. As a general rule, after entering Sleep mode 32, the computer system remains in this mode until any event, chosen in accordance to a desired configuration, causes one of the following power mode transitions to occur. As shown in transition 35, the computer system transfers from the Sleep mode 32 to the Run mode 31 upon detection of, for example, a depressed key of the alphanumeric keyboard or expiration of a sleep "wake-up" timer. The transition 36 from Sleep mode 32 to Shutdown mode 33 usually occurs when the AC-to-DC adapter and the battery packs are decoupled from the computer system for a preselected period of time (e.g., three minutes) or very little energy remains (below a threshold limit such as 2%) in any remaining battery within the computer system.

In shutdown mode 33, only a few critical circuits within the computer system are powered, usually the SMC which controls power allocation, the real-time clock so that dates and times are not lost, and setup configurations of the display within parameter RAM of the SMC. The Shutdown mode 33 has one transition 37 from the Shutdown mode 33 to the Run mode 31 upon detection of a certain event (e.g., when the user performs another preselected key stroke and the battery level is greater than a threshold limit such as five-percent "5%"); however, the computer system remains in this Shutdown mode 33 until the certain event occurs.

Figure 3:
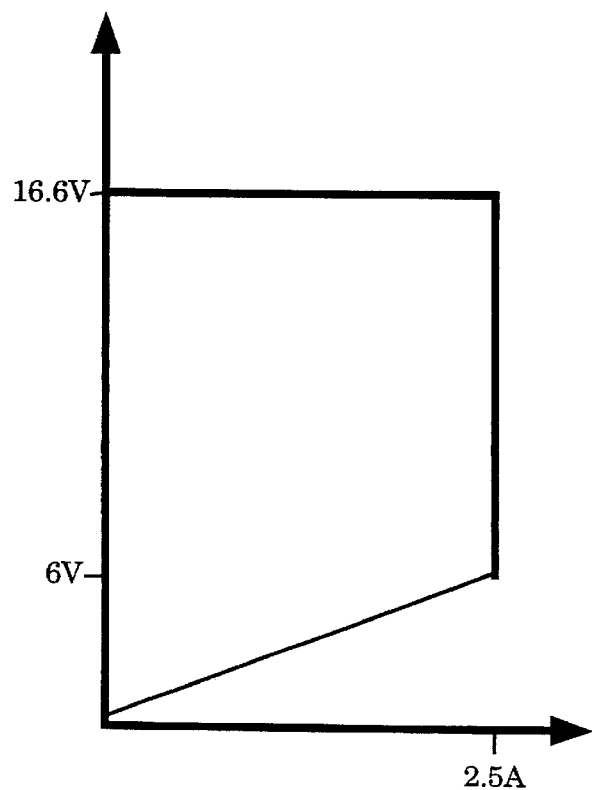
FIG. 3 is a current-voltage curve of a power output generated by the AC-to-DC adapter at a fast charging rate.
Figure 4:
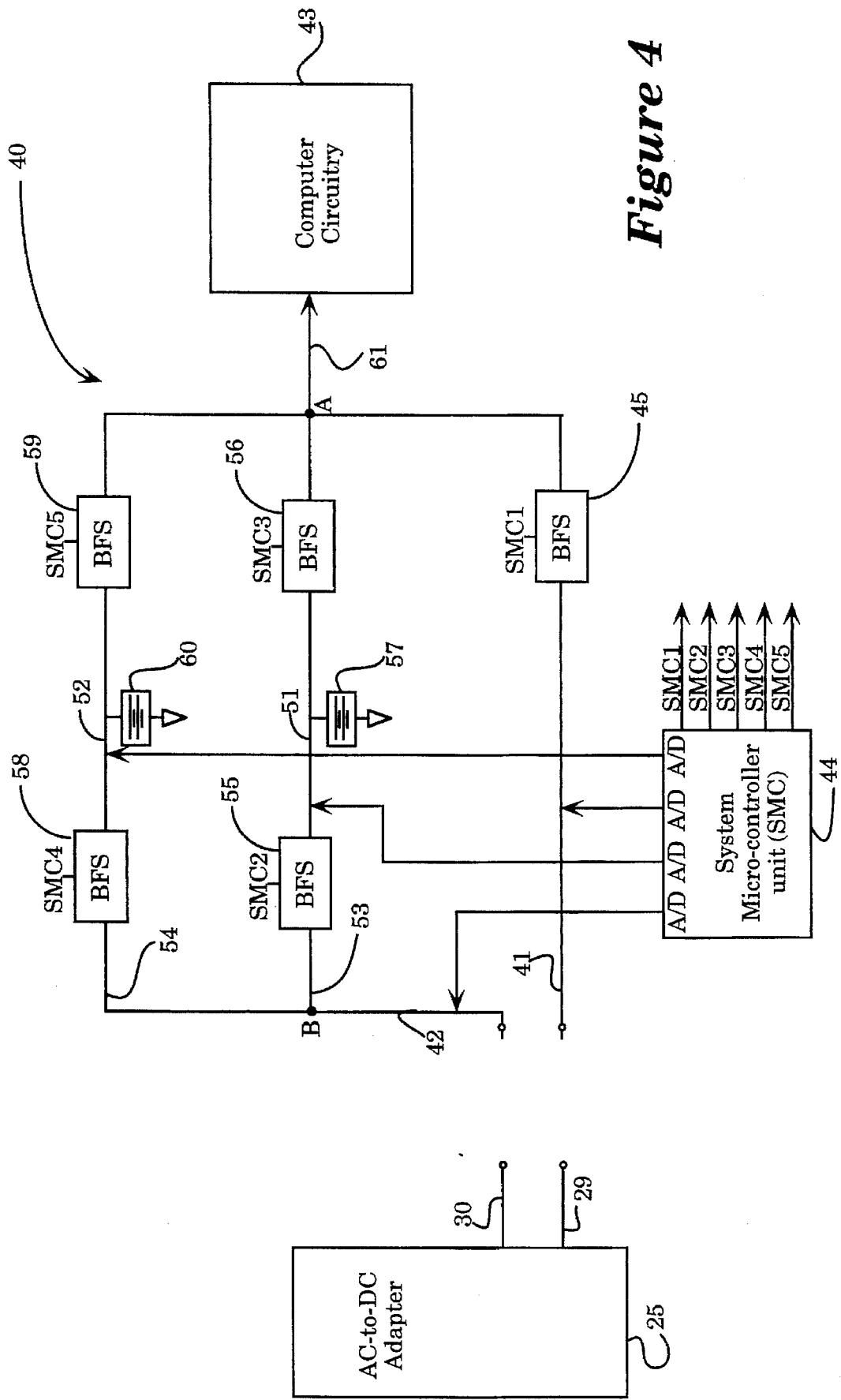
FIG. 4 is a circuit diagram of an embodiment of the battery switching circuit coupled to both an external dual-input AC power adapter and computer circuitry in which a micro-controller unit controls the operation of the battery switching circuit.

Referring back to FIG. 1, the AC-to-DC adapter 25 comprises a first and second adapter power lines 29 and 30 for transmission of a first and second adapter power outputs to the battery switching circuit 40 as seen in FIG. 4. The first adapter power output has a constant current regime of approximately 1.5 Amperes ("A") for voltages generally between 6–16 Volts ("V") and a constant voltage regime (limited at 16.6 V) for currents between 0.005 A and 1.5 A. The second adapter power output has a constant current regime of approximately 1.0 A for 6–16 V, and a constant voltage regime limited at 16.6 V for 0.005–1.0 A. Although, the first adapter power output is primarily dedicated to providing power to run the computer system and the second adapter power output is primarily dedicated to charging the battery packs, it is contemplated that both outputs are capable of charging the battery packs independently and may be tied together to generally yield a 2.5 A constant current for quickly charging of one Nickel battery or for running a computer during a sustained high current need beyond the first adapter power output (e.g., "1.5 A") as shown in an I–V curve of FIG. 3.

More details of the Ac-to-DC adapter 25 and the power mode hierarchy well as a preferably power mode hierarchy are disclosed in a U.S. Patent Application entitled "DISTRIBUTED POWER REGULATION IN A PORTABLE COMPUTER TO OPTIMIZE HEAT DISSIPATION AND MAXIMIZE BATTERY RUN-TIME FOR VARIOUS POWER MODES" (Docket No. 04860.P1284) by inventors David B. Townsley and Shaoan Chin concurrently filed herewith and such disclosure is incorporated herein by reference.

A. Battery Switching Circuit

Referring now to FIG. 4, an embodiment of the battery switching circuit 40 incorporated within the computer system is illustrated, although it is contemplated that the battery switching circuit 40 may be located external to the computer system, for example, in an external battery recharger connected in series with a pair of batteries. The battery switching circuit 40 supports sequential discharging of the battery packs 27 and 28, more particularly, the batteries 57 and 60 within the battery packs 27 and 28, respectively. Sequential discharging, defined as fully discharging power from one of the batteries before discharging power from another battery, provides the consumer more awareness of the amount of run-time remaining in the computer's batteries, more flexibility to replace the depleted battery with a fully charged battery without shutting down the computer system and avoids battery problems associated with memory effects due to incomplete discharge of batteries.

The battery switching circuit 40 further supports sequential and simultaneous charging of the batteries 57 and 60, provided the power source is coupled to both power lines 41 and 42 of the battery switching circuit 40 and the computer system is in low power "Sleep" or "Shutdown" modes. The primary benefit associated with simultaneous charging is that it provides a shorter charging time for two batteries since they are being charged at the same time. Since there exists multiple power lines from the AC-to-DC adapter, the batteries can be charged independently of each other (i.e. charging can be stopped or started at different times for each battery with perhaps, but not necessarily, some period or overlap of concurrent charging). In addition, the battery switching circuit 40 supports a single battery fast charge rate, provided the power source is coupled to both power lines 41 and 42 and the computer system is in low power Sleep or Shutdown modes (See FIG. 10).

Generally, each battery pack includes at least electrical contacts to couple its battery 57 or 60 to the battery switching circuit 40. Thus, the battery 57 or 60 may provide sufficient DC power to the computer circuitry (if needed). As previously mentioned, such batteries 57 and 60 include a plurality of battery cells stacked in series in a well-known conventional configuration; however, it is contemplated that each battery may be implemented as an "intelligent" battery (i.e., incorporated within the "intelligent battery pack") and similarly incorporated within the battery switching circuit as discussed below in greater detail.

The battery switching circuit 40 comprises the first and second power line 41 and 42 coupled to a main power line 61 at node A. The first power line 41 is primarily dedicated to providing power through the main power line 61 to various computer circuitry 43 (e.g., switching regulators linear regulators, a central processing unit, a storage unit, disk drives, communication circuitry, etc.) when the first power line 41 is coupled to a power source such as the AC-to-DC adapter 25. This is accomplished by the system micro-controller ("SMC") 44 enabling a first bilateral Field Effect Transistor ("FET") switch (referred to in the figures as "BFS") 45 so that a first adapter power output of the AC-to-DC adapter 25 is transmitted from the first adapter power line 29 t the computer circuitry 43 along the first power line 41 by enabling the first bilateral FET switch 45. The SMC may include some external buffering logic to simplify specific implementation requirement for a given computer.

Figure 5:
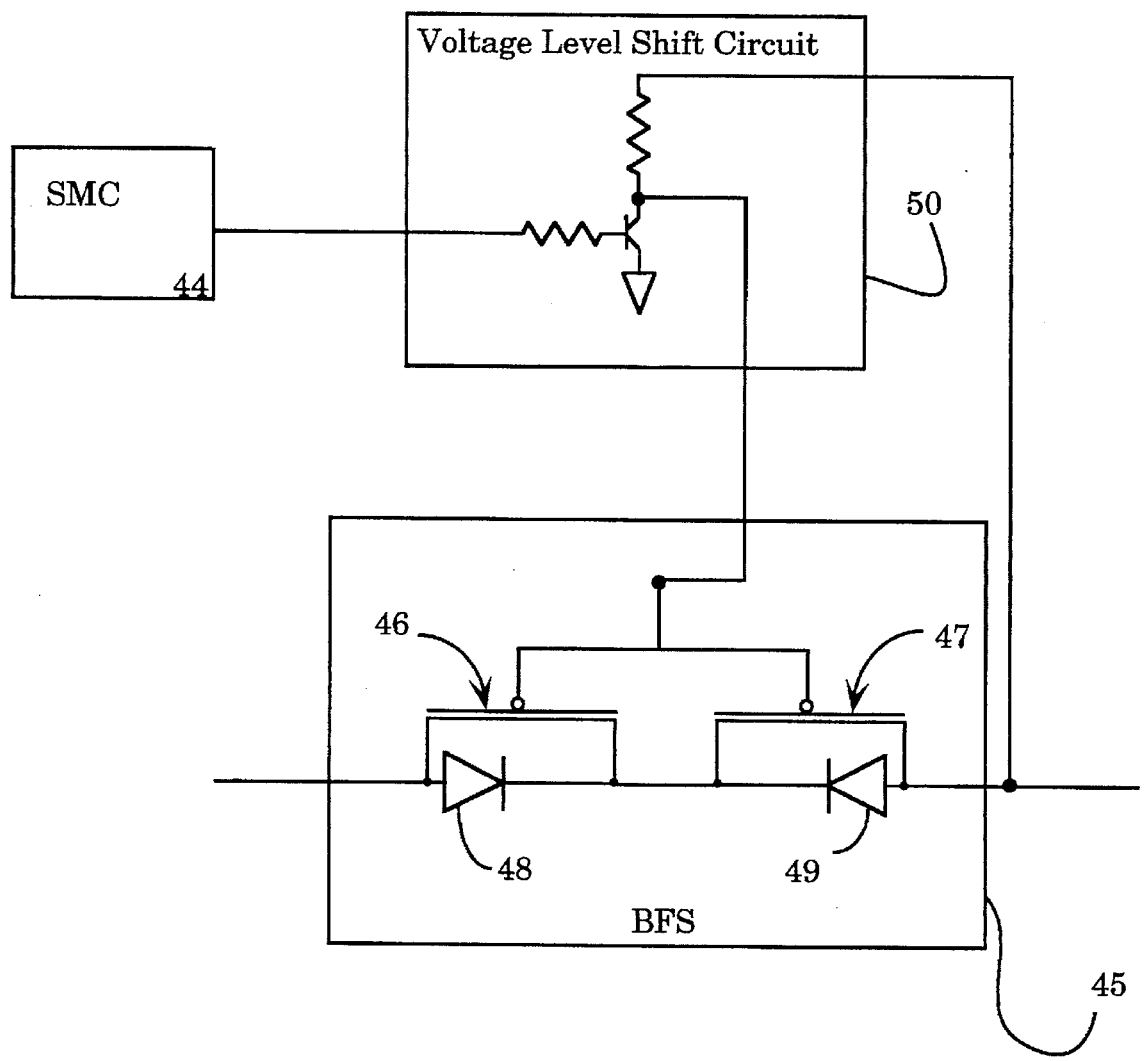
FIG. 5 is a circuit diagram of the bilateral FET switches incorporated within the battery switching circuit.

As shown in FIG. 5, the first bilateral FET switch 45, identical in construction to any other bilateral FET switches referenced herein, comprises two FET switches 46 and 47 (e.g., part number SI9430DY or equivalent) placed in series such that the intrinsic substrate diodes 48 and 49 within the FET switches 46 and 47 are reversed (in opposite directions) with respect to each other. Therefore, current cannot flow through the first bilateral FET switch 45 or any of the FET switches 46 and 47 from either direction unless the bilateral FET switch 45 is enabled by the SMC 44 typically under software control and generally coupled to the first bilateral FET switch 45 through a well-known voltage level-shift circuit 50 as shown (e.g., part number 2N3904 or equivalent). Thus, power can be selectively distributed in any desired hierarchical fashion so that critical components receive power first. This construction is also important to the reliability of voltage measurements by the SMC 44 on the first and second power lines 41 and 42 to determine the presence or absence to the AC-to-DC adapter 25, and on a first and second battery terminal connections 51 and 52 to determine absence or presence and optionally charge of the batteries 57 and 60, respectively.

Referring back to FIG. 4, the second battery power line 42 is divided into a first battery power line 53 and a second battery powerline 54 at node B, but are couple together along with the first power line 41 at node A. The first battery power line 53 couples the first battery 57 to the computer circuitry 43 as well as the second adapter power line 30 (if connected). The first battery 57 is coupled between a second and third bilateral FET switches 55 and 56. The second bilateral switch 55 is coupled to the first and second battery power lines 53 and 54 at node B while a third bilateral switch 56 is coupled to the first power line 41 through the first bilateral switch 45 and the second battery power line 54 through a fourth and fifth bilateral switches 58 and 59 and the main power line 61 at node A.

Similarly, the second battery power line 54 is coupled to the second battery 60, coupled between a fourth and fifth bilateral switches 58 and 59. The fourth bilateral switch 58 is coupled to the first battery power line 53 at node B while a fifth bilateral switch 59 is coupled to the first power line 41 through the first bilateral switch 45, the first battery power line 53 through the second and third bilateral switches 55 and 56 and the main power line 61 at node A. The SMC 44 senses for a voltage on the first and second power lines 41 and 42 on the terminal connections 51 and 52 of the batteries 57 and 60, respectively, and enables or disables the first through fifth bilateral FET switches 45, 55, 56, 58 and 59 to allocate power according to a desired power path.

Figure 6:
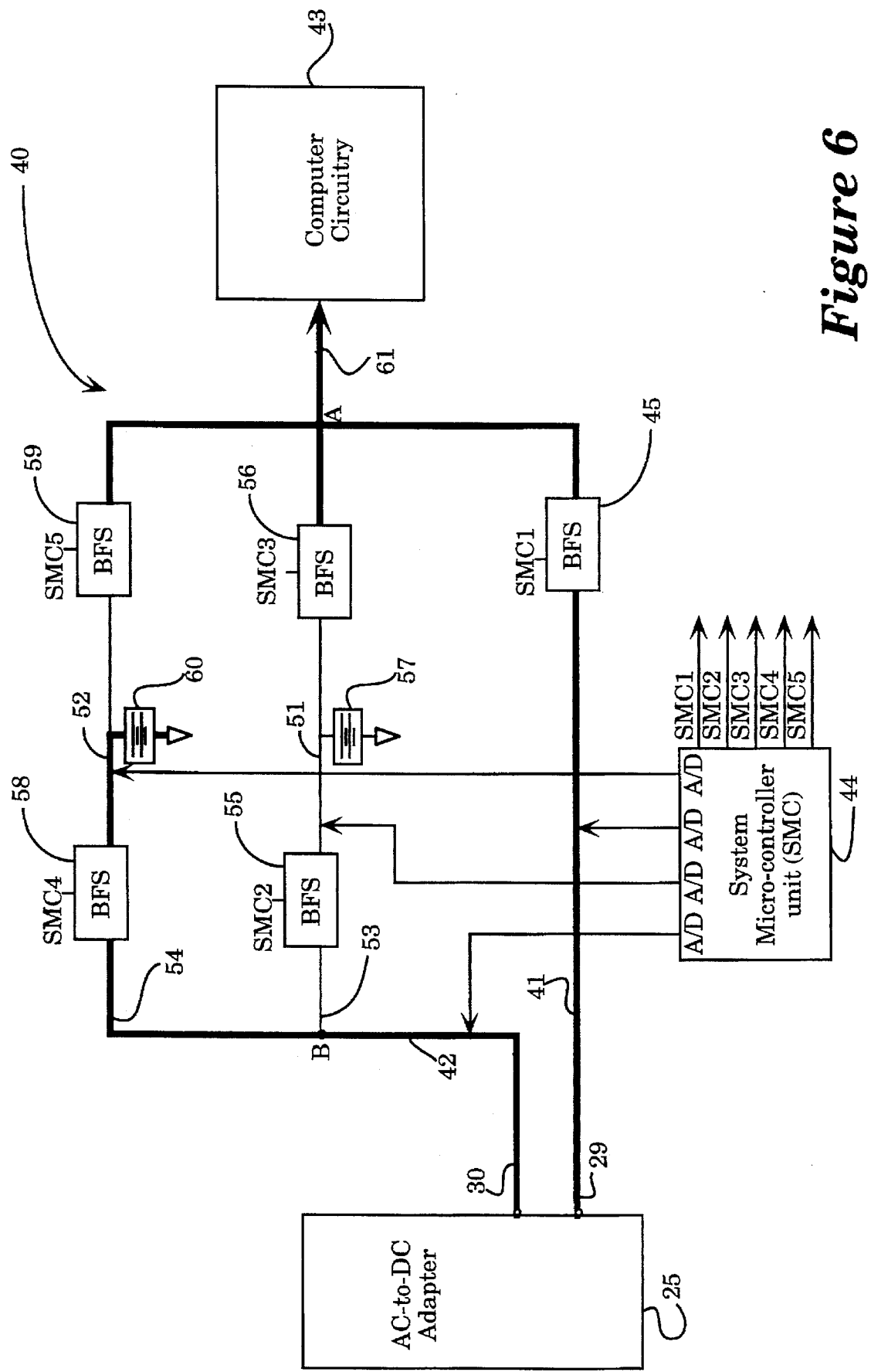
FIG. 6 is a circuit diagram of the embodiment of the battery switching circuit being controlled by the micro-controller to support a chosen power path for providing power to the computer circuitry while simultaneously charging a second battery pack.

Referring to FIG. 6, an example of the switching circuit 40 coupled to the AC-to-DC adapter 25 for powering the computer circuitry 43 while charging the second battery 60 is illustrated. In this case, the SMC 44 enables the first and fourth bilateral FET switches 45 and 58 and disables the remaining bilateral FET switches 55, 56 and 58 of the switching circuit 40. As a result, power from the first power line 41 passes through the first bilateral FET switch 45 to the main power line 61 to power the computer circuitry 43 while power from the second power line 42 passes through the fourth bilateral FET switch 58 to charge the second battery 60.

Figure 7:
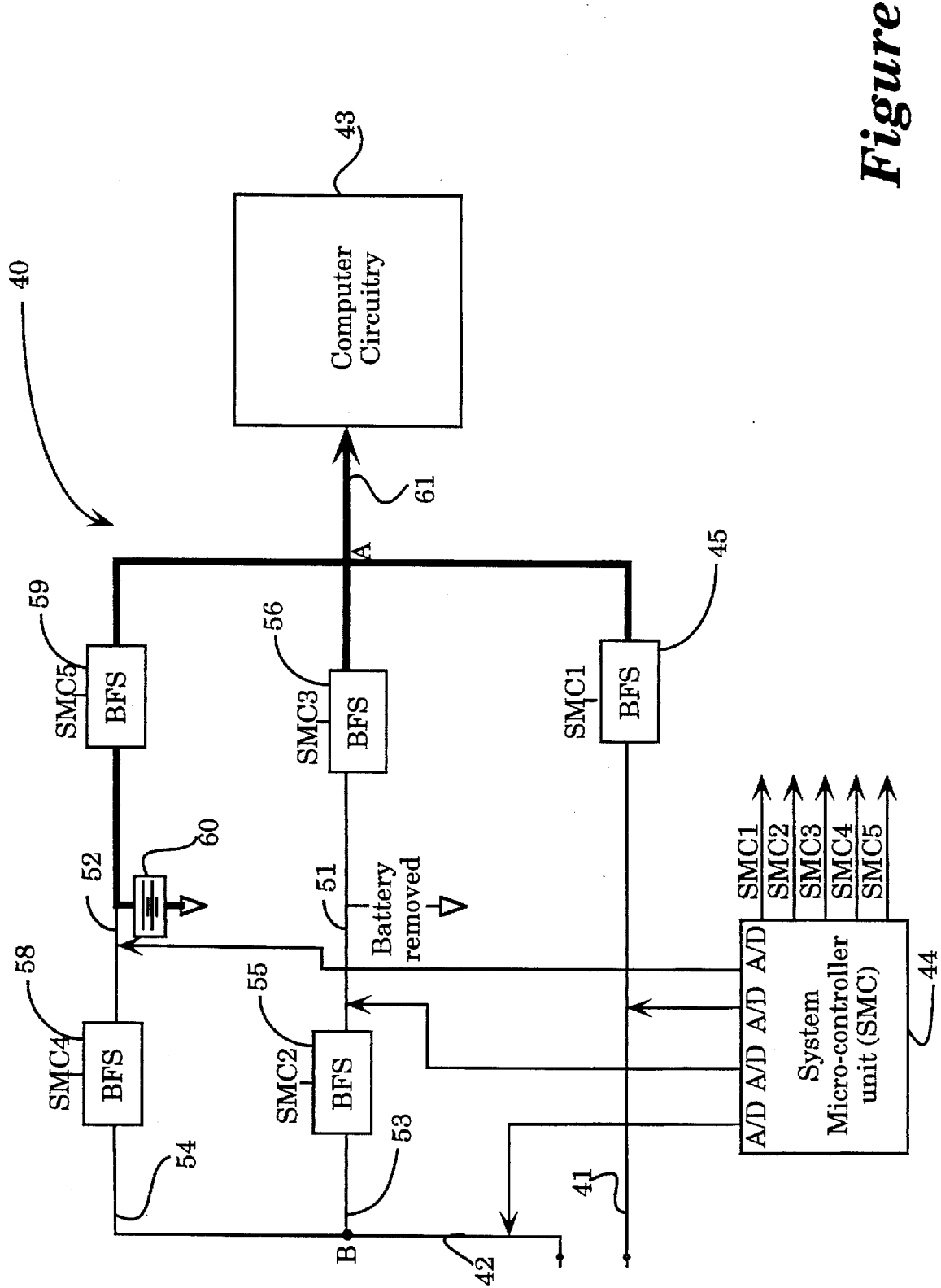
FIG. 7 is a circuit diagram of the embodiment of the battery switching circuit being controlled by the micro-controller to support a chosen power path for providing power to the computer circuitry through a battery pack.
Figure 8:
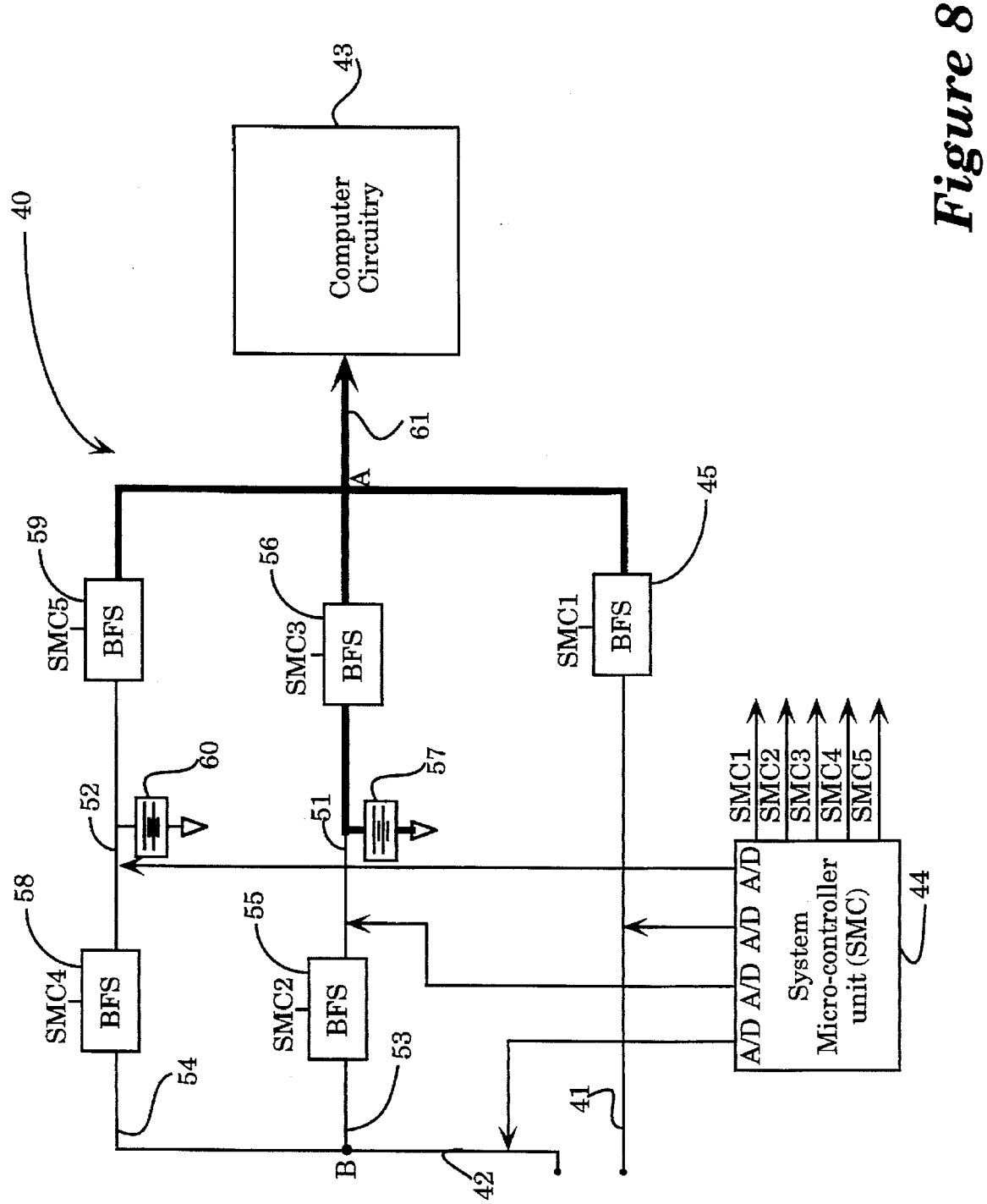
FIG. 8 is a circuit diagram of the embodiment of the battery switching circuit being controlled by the micro-controller to support a chosen power path for providing power to the computer circuitry through an alternative battery pack.

Referring now to FIGS. 7 and 8, two examples of the switching circuit 40 supplying power from the second battery 60 and the first battery 57 to the main power line 61 for use by the computer circuitry 43 when the AC-to-DC adapter 25 is disconnected from the switching circuit 40 is illustrated. In FIG. 7, the SMC 44 merely enables the fifth bilateral FET switch 59 so that power from the second battery 60 can be discharged therefrom. The remaining bilateral switches 45, 55 56 and 58 are disabled. In FIG. 8, however, the third bilateral FET switch 56 is enabled by the SMC 44 while the other bilateral switches are disabled so that power from the first battery 57 is discharged to the main power line 61 for use by the computer circuitry 43.

Figure 9:
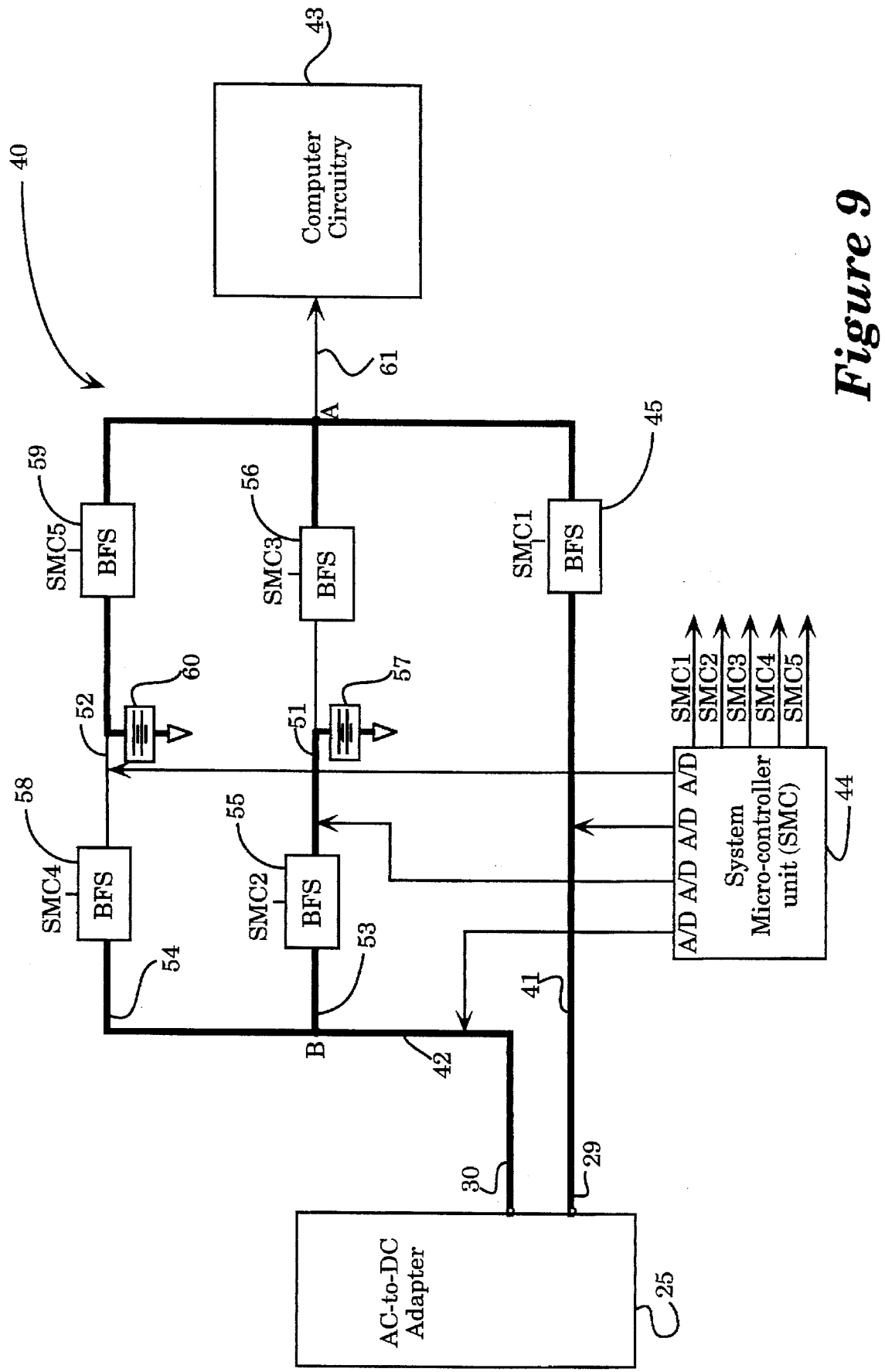
FIG. 9 is a circuit diagram of the embodiment of the battery switching circuit being controlled by the micro-controller to support a chosen power path for simultaneously charging both battery packs, when the computer is off or using no significant power.

Referring to FIG. 9, an example of simultaneous charging of the two batteries 57 and 60 is illustrated wherein the AC-to-DC adapter 25 is coupled to the first and second power lines 41 and 42 and the computer system is in low power mode i.e. "Sleep" or "Shutdown" power modes. With simultaneous charging, both batteries may be fully charged in the same time as it would take to charge one battery in the sequential charging manner when the computer is running as illustrated by power being supplied to the computer circuitry 43. In this example, the SMC 44 enables the second bilateral FET switch 55 so that power from the second power line 42 charges the first battery 57. It is noted that the fourth bilateral FET switch 58 remains disabled since it is undesirable to charge the battery packs 57 and 60 through a single power line because by randomly splitting a constant current, it is virtually impossible to properly charge the batteries 57 and 60 of the Nickel-based batteries. Improper charging of the batteries 57 and 60 will either reduce their cycle life longevity by overcharging or reduce their capacity available by undercharging. Thus, the first and fifth bilateral FET switches 45 and 59 are also enabled so that power from the first power line 41 can be used to charge the second battery 60.

Figure 10:
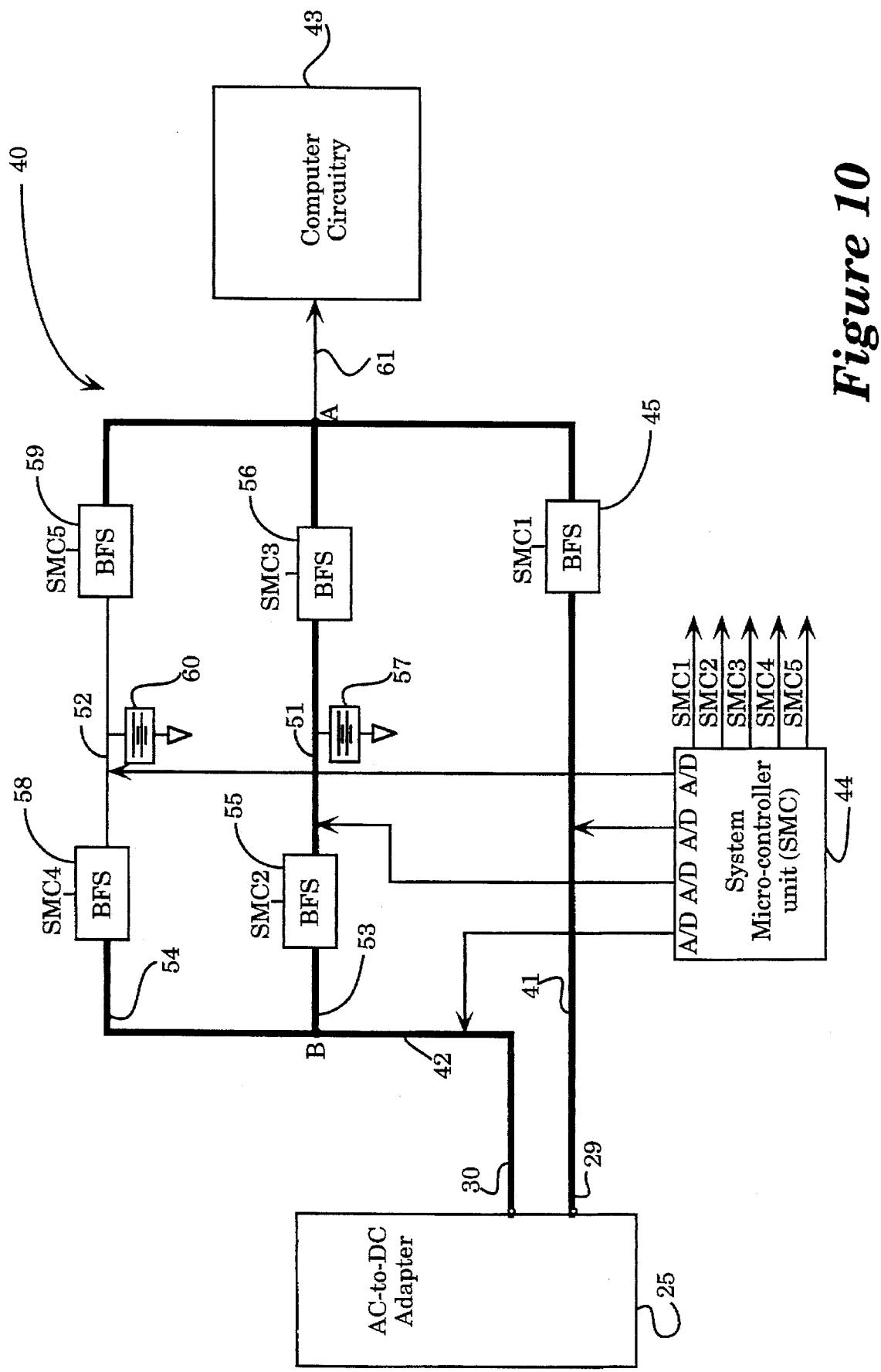
FIG. 10 is a circuit diagram of the embodiment of the battery switching circuit enabling fast charging of the first battery.

Referring to FIG. 10, a fast charge method may be employed when the computer is in Sleep or Shutdown modes to charge either battery in one-half the time normally taken for charging a battery when the computer system is running. As mentioned previously, the AC-to-DC adapter can support the fast battery charge rate because its outputs do not sink current, rather they only source power. As shown, the first battery 57 is selected to be "fast charged." The SMC 44 enables the first, second and third bilateral FET switches 45, 55 and 56 and disables the fourth and fifth bilateral FET switches 58 and 59. Thus, regulated DC power from the AC-to-DC adapter 25 is supplied to the first battery 47 through both charging directions.

Figure 11:
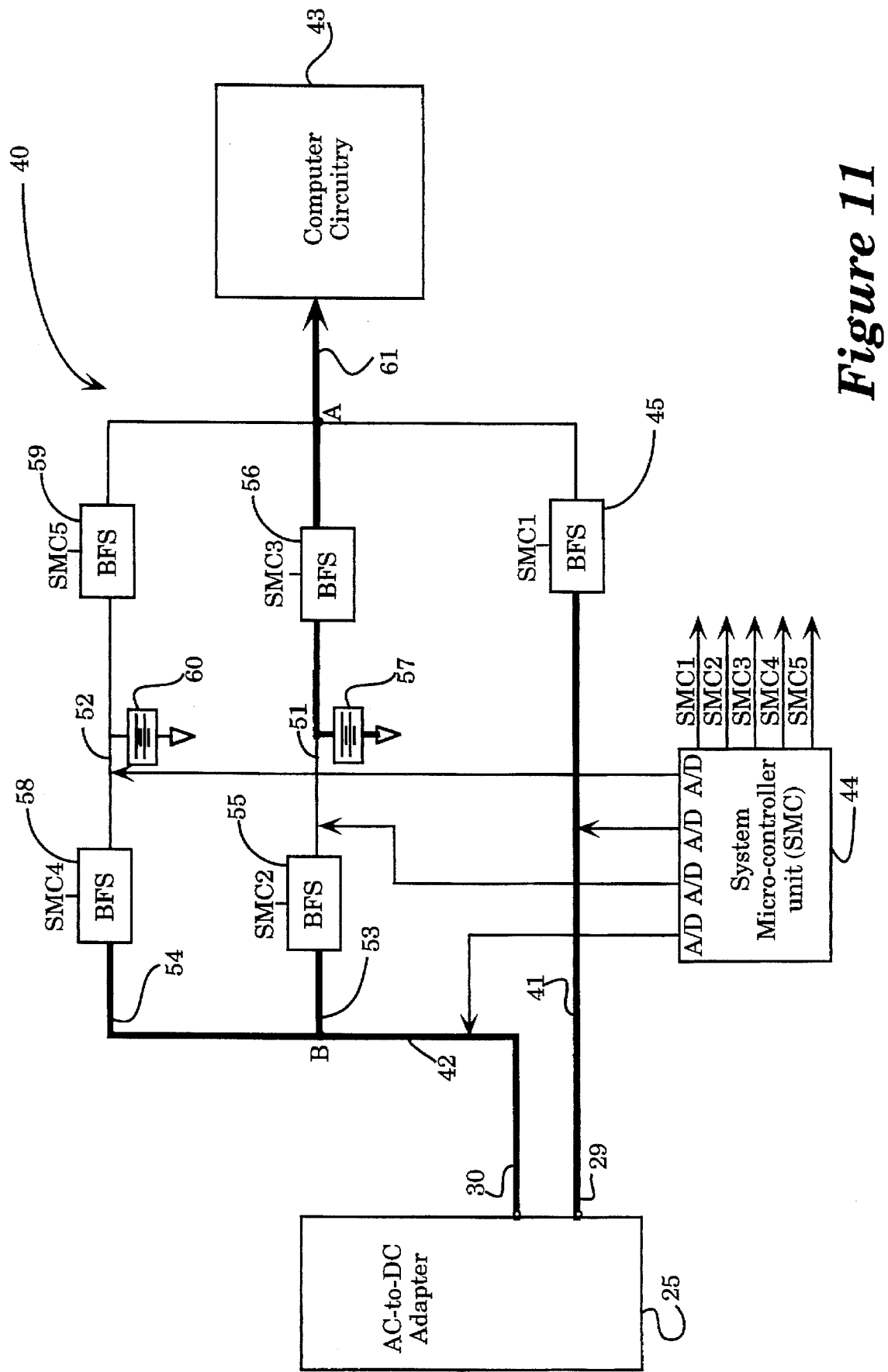
FIG. 11 is a circuit diagram of the embodiment of the battery switch circuit enabling deep discharge even though the AC-to-DC adapter is coupled to the battery switch circuit.

Referring to FIG. 11, the battery switching circuit enables one of the batteries of the battery switching circuit to be deep discharged to avoid accrued "memory effects", even though the AC-to-DC adapter is connected. In this embodiment, the first battery 57 is deep discharged so that only the third bilateral FET switch 56 is enabled; however, it is contemplated that the second battery 60 could be deep discharged by enabling the fifth bilateral 59 switch in lieu of the third bilateral switch 56. This embodiment is useful to allow a deep discharge cycle to be conducted and then followed by a charge cycle automatically through SMC (e.g., overnight automatic battery reconditioning process without need for the user to later connect the AC-to-DC adapter).

Figure 12:
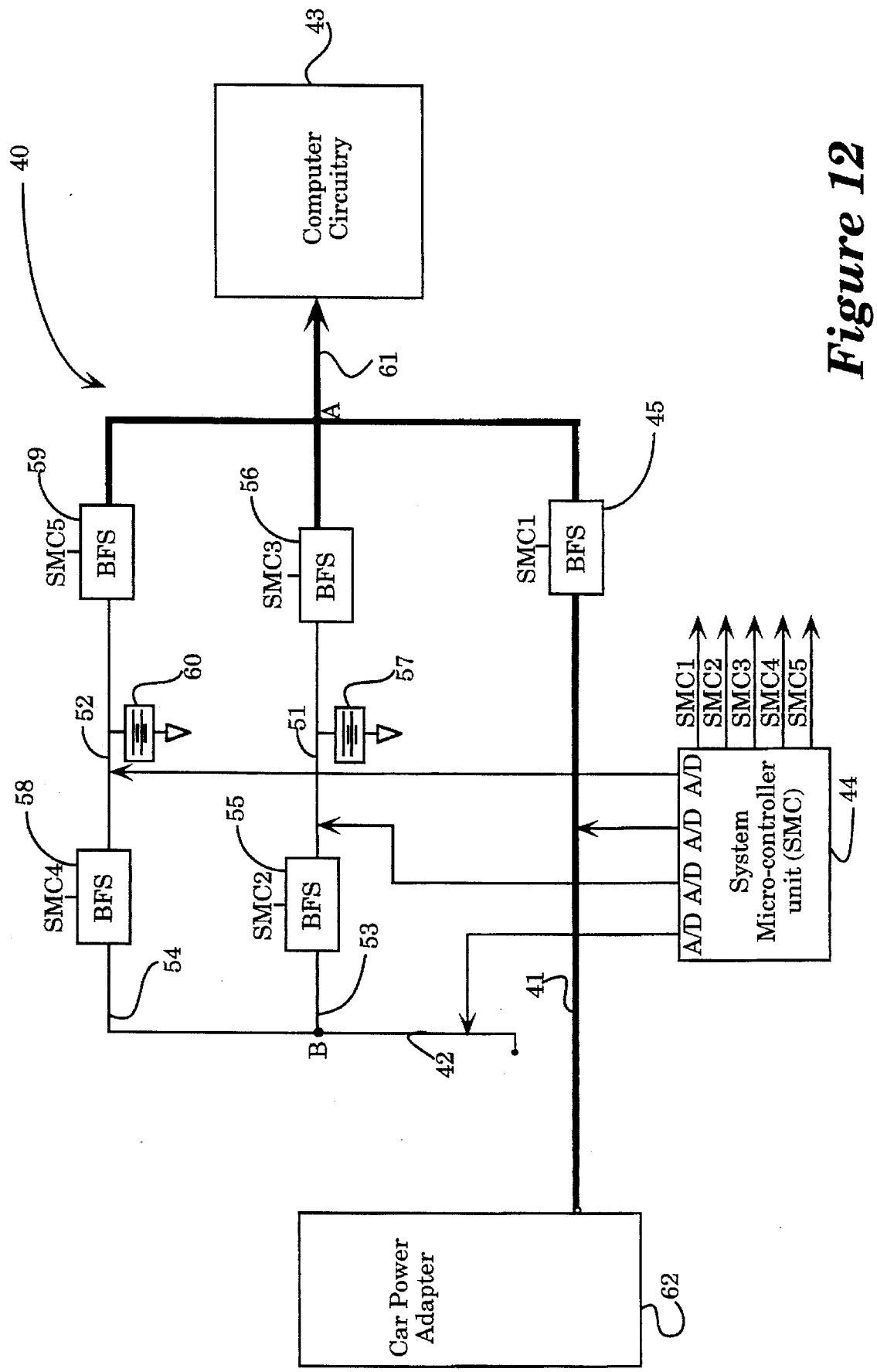
FIG. 12 is a circuit diagram of the embodiment of the battery switching circuit coupled to an automobile cigarette lighter adapter instead of the external AC power adapter to provide power to the computer circuitry.

Referring to FIG. 12, in lieu of the AC-to-DC adapter, it is contemplated that a low cost car power adapter 62 (e.g., from a car cigarette lighter) may be utilized to provide power through the first power line 41 and the main power line 61 to the computer circuitry 43. It is common knowledge that the conventional automobile cigarette lighter adapter ("car power adapter") is an unregulated power source. Using the car power adapter 62 which may be merely a cable 63 having some voltage surge suppression components, the car power adapter 62 may be implemented inexpensively for solely supplying DC power to the computer circuitry 43. If, however, the car power adapter 62 is designed to include two regulated power outputs, it also may be used to charge the batteries 57 and 60 as in FIGS. 6, 9 and 10. Upon detecting a power output on only the first power line 41, the SMC 44 detects that the car power adapter 62 is being used in lieu of the AC-to-DC adapter 25 and appropriately disables the second through fifth bilateral FET switches 55, 56, 58 and 59 so that power is only supplied to the computer circuitry having power regulatory components.

B. Control of the Battery Switching Circuit by the SMC

It is clear that the SMC obtains information concerning a power level of the AC-to-DC adapter inputs and both of the battery packs through analog/digital ("A/D") readings of voltage levels of the battery terminal connections 51 and 52 and the first and second power lines 41 and 42. Based on the nature of the voltage information retrieved, the SMC enables an disables certain bilateral FET switches to allow the AC-to-DC adapter to charge one or both of the battery packs, one of the battery packs to discharge power to circuitry within the computer system and the like. Since the SMC may be used in a number of ways to practice the present invention, no program listings have been provided. It is considered that the above-discussed examples of specific operations of the battery switching circuit and a general operation flowchart (shown below in FIGS. 13a and 13b) provide sufficient disclosure to permit an ordinary person skilled in computer design to practice the present invention.

Figure 13A:
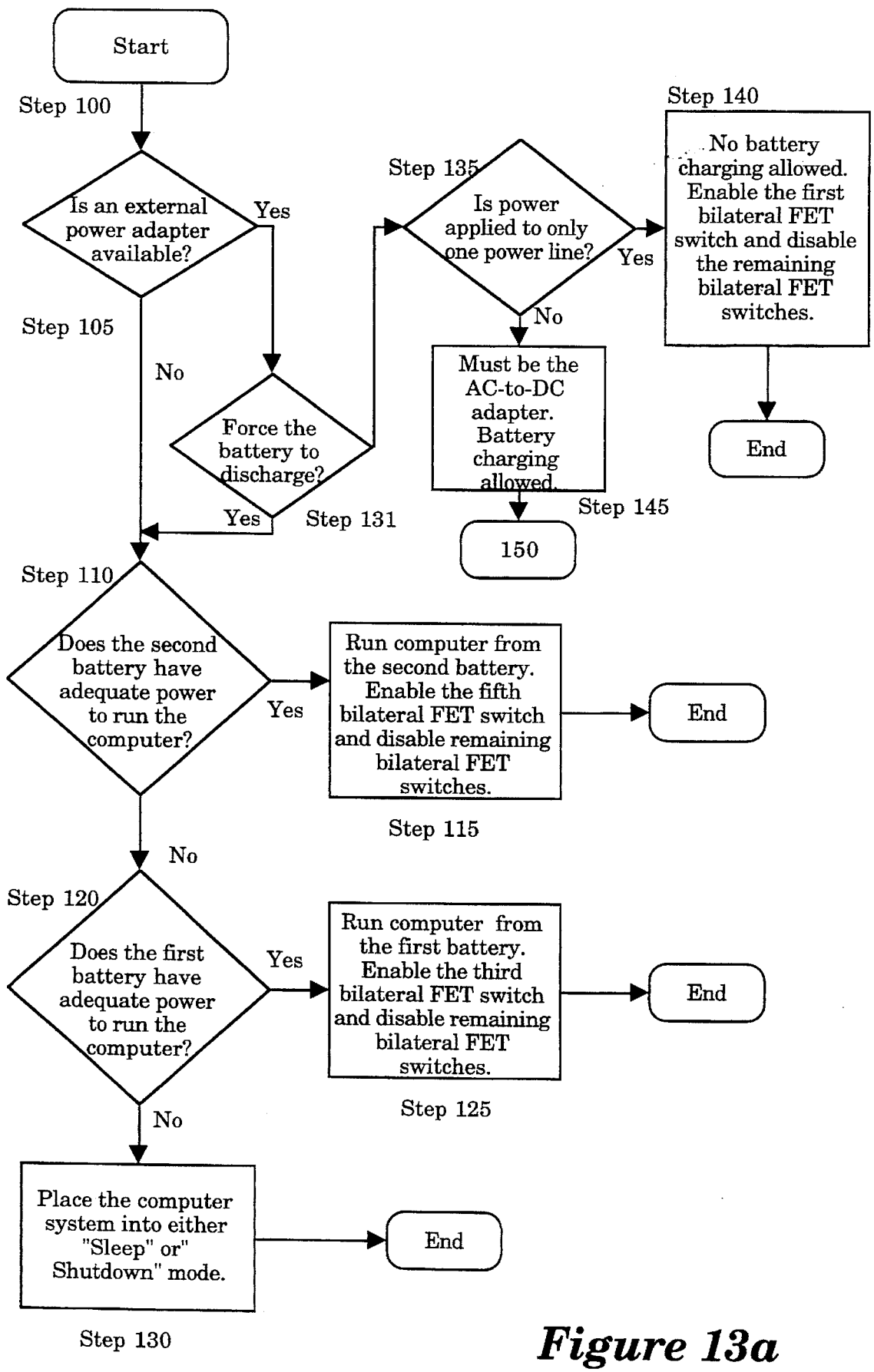
FIGS. 13a and 13b are flowcharts of the general operations of the system micro-controller is ascertaining from which power source to obtain power and whether charging of any of the batteries is necessary.
Figure 13B:
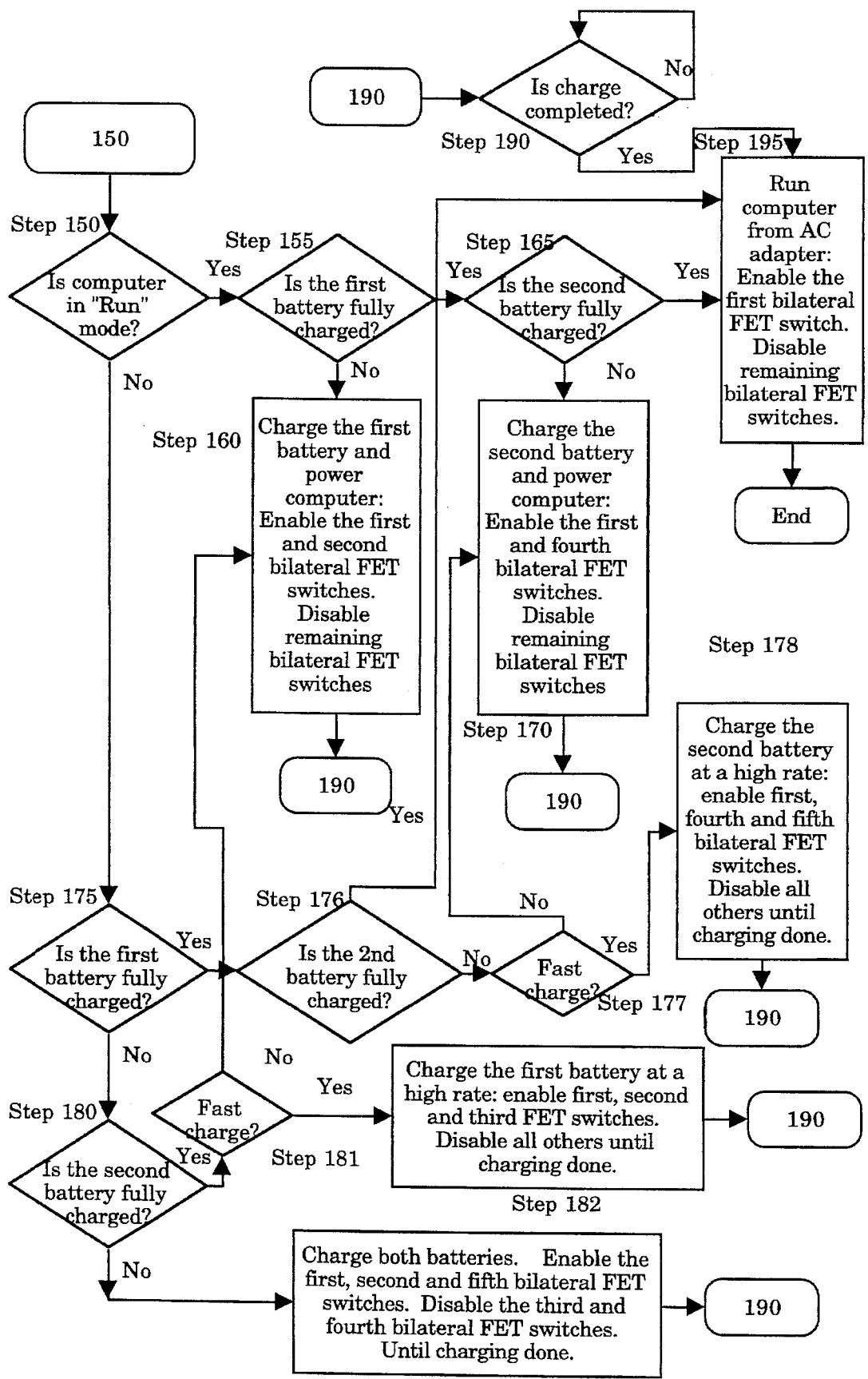

Referring to FIGS. 13a and 13b, a flowchart illustrating the general operations performed by the SMC in selecting an appropriate power path and whether to charge one or both of the batteries is illustrated. In step 105, the SMC determines whether an external adapter is coupled to the battery switching circuit by sensing voltage on both of the first and second power lines. In the event that no external adapter is coupled to the battery switching circuit, the SMC ascertains whether the second battery has adequate power to run the computer system (Step 110). If so, the SMC enables the fifth bilateral FET switch and disables the four remaining bilateral FET switches (Step 115).

In the event that the second battery does not have enough power (i.e., by checking A/D voltage sense at the second battery terminal connection 52, the SMC checks whether the first battery does (Step 120). If so, the SMC enables the third bilateral FET switch an disables the remaining bilateral FET switches (Step 125). If not, the SMC places the computer system into either "Sleep" or "Shutdown" mode to reduce power since it is only running from an auxiliary battery source at this point (Step 130).

Returning to step 105, if the SMC senses voltage in either the first or second power line of the battery switching circuit, a determination is made by whether it is desirable to force one of the batteries to fully discharge all of its stored power (Step 131). This may be accomplished by the SMC setting a variable upon detection of memory effects. If so, the SMC undergoes those operations associated with Steps 110–130. If force discharge is not desired, the SMC then determines whether voltage is applied to both power lines or just the first power line (Step 135). If the latter, the car power adapter is coupled to the battery switching circuit so that the SMC only enables the first bilateral FET switch and disables the remaining bilateral FET switches so that power may only be supplied to the computer circuitry (Step 140). If there exists voltage on both the first and second power lines, the SMC may enable certain bilateral FET switches of the battery switching circuit so that one or both of the batteries may be charged since the AC-to-DC adapter is coupled thereto (Step 145) and proceeds to Step 150.

Shown in FIG. 13b, in Step 150, the SMC ascertains whether the computer system is in "Run" mode indicating that significant power will be needed to run the computer circuitry. If so, only one battery may be charged at a time and the SMC determines whether the first battery is fully charged (Step 155). If the first battery is not fully charged, the SMC only enables the first and second bilateral FET switches to power the computer circuitry and charge the first battery (Step 160) until completion (Step 190) so as to proceed to Step 195 where charging is stopped.

In the event that the first battery is fully charged, the SMC next determines whether the second battery if fully charged (Step 165). If not, only the first and fourth bilateral FET switches are enabled by the SMC (Step 170) until completion (Step 190) and thereafter, the SMC stops charging of the second battery upon proceeding to Step 195. If both batteries are fully charged, the SMC only enables the first bilateral FET switch to power the computer circuitry (Step 195).

Returning back to step 150, if the computer system is operating in either Sleep or Shutdown power modes, essentially all the power is available from both outputs of the AC-to-DC adapter for potentially charging both batteries simultaneously or charging one battery at a fast battery charge rate. Next, the SMC checks whether the first battery is fully charged (Step 175). If so, the SMC checks whether the second battery is fully charged at Step 176. If the second battery is also fully charged, the SMC simply runs the computer from the AC-to-DC adapter (Step 195). If not, the SMC checks if fast charge of the second battery is desired (Step 177). If fast charge of the second battery is desired as stated in Step 178, the SMC enables the first, fourth and fifth bilateral switches and disables the second and third switches for charging of the second battery until completion (Step 190). Thereafter, the SMC performs the operations of Step 195. If fast charging of the second battery is not desired, the SMC performs the operations of Step 170 to charge the second battery at a regular rate.

If the first battery is not fully charged, the SMC checks whether the second battery is fully charged (Step 180). In Step 181, the SMC determines whether fast charging is desired. If fast charging is not desired, the process reverts to Step 160 to charge the first battery only at the regular rate. Otherwise, if fast charging is desired the first battery is charged at the fast battery charge rate by enabling the first, second and third bilateral FET switches and disabling the others at Step 182 until completion (Step 190), thereafter proceeding to Step 195. In the event that both batteries are not fully charged, only a first group (first, second and fifth bilateral FET switches) or a second group (first, third and fourth bilateral FET switches) are enabled to charge with batteries simultaneously (Step 185). It is contemplated that another embodiment could enable fast charging of one battery and then the other in lieu of Step 185, according to some predetermined order.

C. Battery Switching Circuit Employing the "Intelligent" Battery Packs.

It is contemplated that yet another embodiment of the present invention may be accomplished by using a pair of "intelligent" battery packs coupled to the battery switching circuit of FIG. 4 instead of batteries 57 and 60. The simultaneous and sequential charging and sequential discharging of the batteries within the intelligent battery packs are controlled by the SMC executing a re-entrant battery charging process capable of supporting a variety of battery technologies. Hence, the battery charging process is practically battery technology independent unlike conventional processes.

Figure 14:
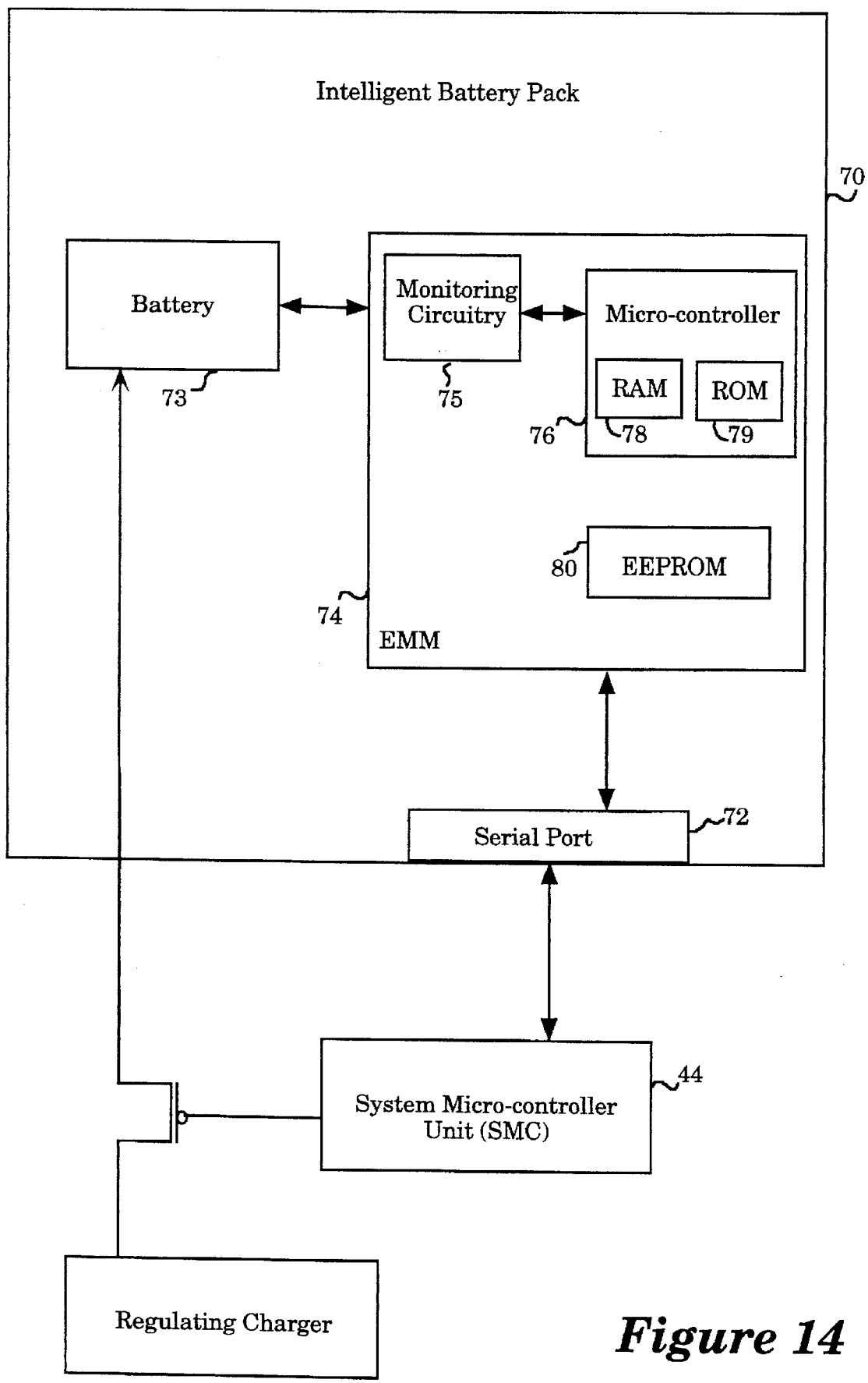
FIG. 14 is a block diagram of an embodiment of the intelligent battery pack including a battery and an Energy Monitor Module providing battery characteristics to the system micro-controller, wherein the battery is appropriately coupled to the battery switching circuit.

As shown in FIG. 14, an embodiment for each of the intelligent battery packs 70 and 71 (only the intelligent battery pack 70 is shown since both are of identical construction) comprises a battery 73 identical in construction to batteries 57 and 60 of FIGS. 4, 6–12) and an Energy Monitor Module ("EMM") 74 including monitoring circuitry 75 that measures and calculates certain characteristics of the battery 73 (e.g. its temperature, current and voltage levels), a single chip internal micro-controller 76 including random access memory ("RAM") 78, read only memory ("ROM") 79. The internal micro-controller 76 controls the monitoring circuitry 75 and an electrical erasable and programmable read only memory ("EEPROM") 80. The characteristics, which are used primarily by the SMC 44 in controlling the charging of the battery switch circuit, are updated continuously after a set period of time and stored in specific "parameters" (e.g., storage words, bytes, bits, etc.) listed in Appendix A.

With respect to the EEPROM 80, it typically stores mostly static information (i.e., characteristics) that are intended to provide the SMC 44 specific information about a type of battery employed in the battery pack 70 (e.g., Li-Ion, NiMH, NiCad, etc.). The ROM 79, however, contains instruction code used by the internal micro-controller 76 to obtain characteristics related to a power level of the battery 73 and transfer such characteristics to the SMC 44. The RAM 78 is used for program data and for storing certain characteristics of the battery that are more dynamic, such as temperature, voltage, current, state of charge, etc. Together, the RAM 78, ROM 79 and EEPROM 80 enable the EMM 74 to effectively monitor the power level of the battery 76 and provide characteristics to the SMC 44 serially through a serial port 72 to enable it to perform a proper charging routine for a specific battery type.

Referring to FIGS. 15–18, the SMC performs the battery charging process which is adaptable to the charging requirements of each battery. The battery charging process comprises three distinct phases; namely, a monitoring phase, a charging phase and an error phase. The monitoring phase basically determines whether one or both of the batteries require charging. In the event that at least one of the batteries requires charging, an appropriate sub-phase of the charging phase is selected based on (i) a measured energy level of the battery and (ii) certain requirements of the battery as specified in the EEPROM parameters within the EMM that are accessible by the SMC.

In a preferred embodiment, there exist three charging sub-phases referred to as an "initial charge" sub-phase, a "bulk charge" sub-phase and a "pulse maintenance charge" sub-phase. When charging the battery within the intelligent battery pack, any one or combination of sub-phases may be necessary, again depending on a general battery "PROFIL" parameter configured for the battery type and other available parameters associated with the battery. The initial charge sub-phase checks for a short within the battery itself and, if needed, provides a minimal amount of power to the battery to enable the internal micro-controller to monitor its voltage.

The bulk charge sub-phase is used for actual charging of the battery, provided the SMC senses an electrical connection between the two adapter power lines of the AC-to-DC adapter and the first and second power lines of the battery switching circuit. As a result, the battery is charged by the AC-to-DC adapter while the internal micro-controller monitors the battery for a charge termination condition, (i.e., the full charge indication of a fully charged battery). For example, the charge termination condition for a Nickel battery is achieved when the battery experiences a continual negative change in voltage ("NiCad") or a time-temperature gradient that exceeds a predetermined threshold ("NiMH"). Likewise, the charge termination condition for a Li-Ion battery is reached upon detection of a certain voltage in conjunction with a timer expiration.

Upon reaching the charge termination condition, the pulse maintenance charge sub-phase is used to maintain the battery at a maximum charge level by pulsing the battery with current on a duty cycle as well as verifying that the battery has not suffered a shorted battery cell or some degradation. This phase is of primary interest to Nickel batteries, which typically experience self-discharge causing a loss of energy.

Although not illustrated in the Figures, the Error phase is generally an idle phase requiring some event to occur before exiting the Error phase. Otherwise, the battery remains in the Error phase and never receives charge.

Figure 15A:
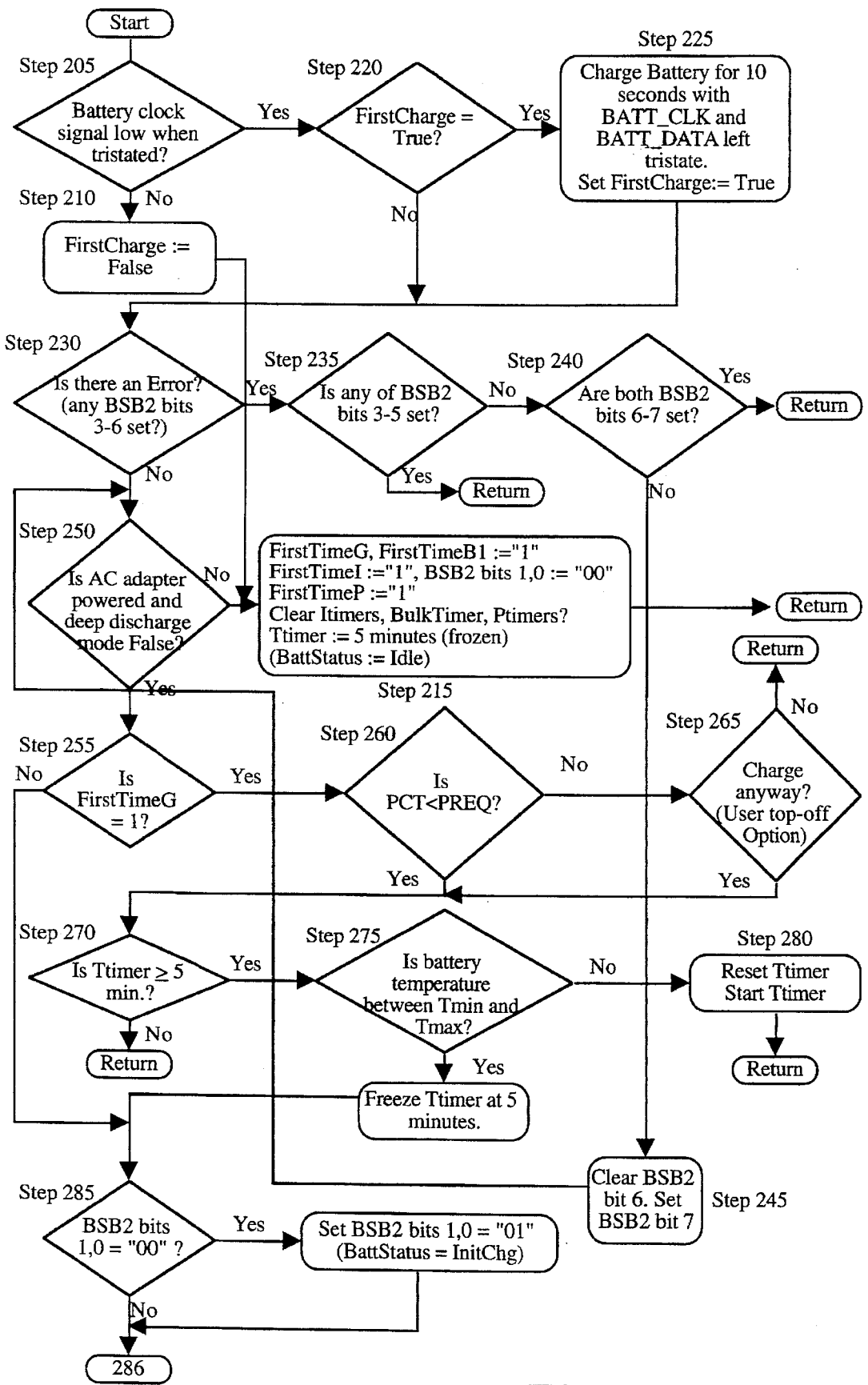
FIGS. 15a and 15b are flowcharts of a battery charging process, utilized by the system micro-controller in charging multiple battery types without any intervention by the consumer.
Figure 15B:
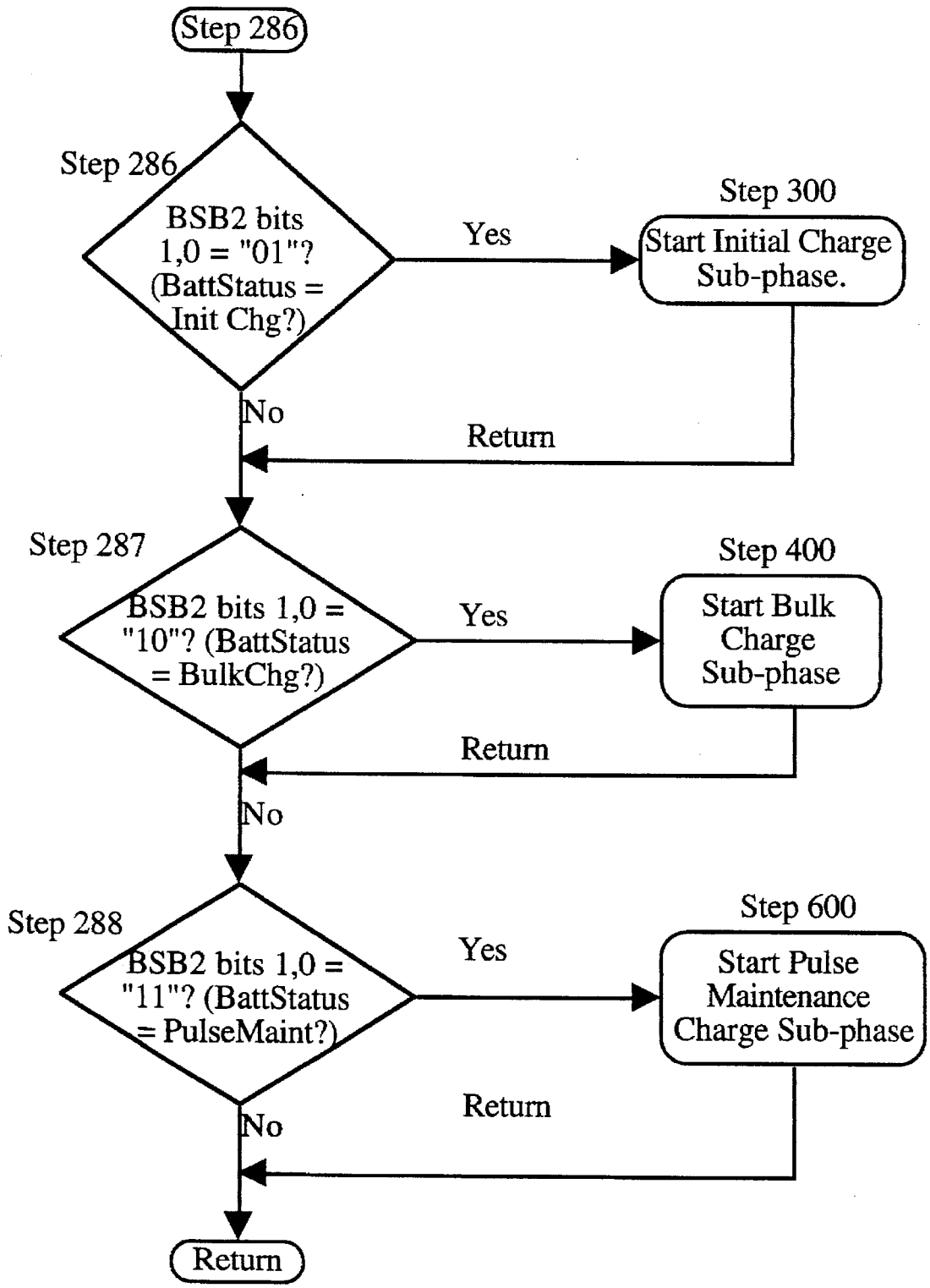

Referring to FIGS. 15a and 15b, a flowchart of the battery charging process is illustrated. In this preferred embodiment, the battery charging process is performed on a given battery once a second by the SMC. In a monitoring phase, beginning at Step 205, the SMC determines whether the battery within the intelligent battery pack is appropriately coupled to the computer system by sensing for a low battery clock signal. If the battery is decoupled from the computer system, a number of state variables are initialized and a number of timers are reset (as shown) so that certain tests will be performed on the battery when initially coupled to the computer system. Additionally, a first and a second bit (bit 0,1) of a Battery Status Byte 2 ("BSB2") parameter are not activated thereby indicating that the battery charging process is idle (Steps 210–215). However, if the battery pack is appropriately coupled to the computer system, the SMC checks whether the intelligent battery pack has just been installed (i.e. whether a FirstCharge variable is "true") for subsequent testing reasons (Step 220).

Assuming that the intelligent battery pack has just recently been installed, the battery of the intelligent battery pack is charged for a short period of time (e.g., 10 seconds) to guarantee some initial amount of energy (Step 225) before entering an error detection stage of the monitoring phase (Step 230). In contrast, if it is not a first time installation (Step 220), the process flows directly to the error detection stage (Step 230) in which the SMC ascertains if the battery has recently experienced any errors by checking whether certain bits within the BSB2 parameter are set; namely, bits 3–6 of the BSB2 parameter. If the battery has experienced an error, a determination is made whether the error is a "hard" error i.e., BSB2 bits 3–5 are set (Step 235) or a "soft" error i.e., BSB2 bit 6 is set (Step 240). A "hard" error requires immediate service so that the battery charging process is returned to a top level program, which directs multiple battery charging, discharge control and other tasks, without performing any charging on the battery. A single "soft" error does not cause the battery charging process to abort unless two software errors have occurred in succession. Rather, as shown in Step 245, a bit 7 of the BSB2 parameter is set as a "carry" of the state of bit 6 and bit 6 is cleared to allow it to be set if a second "soft" error should occur. Thereafter, the monitoring phase transitions to Step 250.

In Step 250, the SMC determines whether the AC-to-DC adapter is powered and that the optional deep discharge mode is false. The deep discharge mode, if enabled, would allow a battery to be discharged in spite of the AC-to-DC adapter being powered, to cure any accrued "memory effects". If the AC-to-DC adapter is not powered or the deep discharge mode is true, then the state variables and timers are initialized and reset, respectively (similar to Step 215), and the process returns to a top level program which directs multiple battery charging, discharge control and other tasks. However, if the AC-to-DC adapter is powered and the deep discharge mode is false, the SMC determines whether it is a first pass through the monitoring phase and if so, more tests are still needed before entering the charging phase (Step 255).

In the event that this is the first time through the monitoring phase (i.e., a "FirstTimeG" variable is set), a determination is made to ascertain how much energy remains in the battery. This determination is accomplished by comparing two parameters stored in the EMM, namely a measured percentage of charge capacity of the battery ("PCT") to a static minimum percentage of charge required to bypass the bulk charging phase ("PREQ") (Step 260).

Assuming PCT>PREQ, the consumer may optionally select charging (Step 265). Alternatively, if PCT<PREQ, a temperature timer ("Ttimer"), possibly reset in Step 215, is checked for being of longer duration than or equal to a prescribed time limit (e.g., five minutes) to ensure charging within an appropriate battery temperature range between a minimum temperature ("Tmin") and a maximum temperature ("Tmax") (Steps 270–275). If the battery temperature falls outside this range, the Ttimer is reset and restarted in order to allow sufficient time for the battery to heat up or cool down so that charging can occur within the appropriate battery temperature range to prevent degradation of the battery (Step 280). The Ttimer is used because the battery has a very slow time constant in relation to heat dissipation, requiring a reasonable amount of time to cool down or to speed up in lieu of the SMC having a very fast time constant for executing programming. If the battery temperature falls within the range, the Ttimer is stopped and a transition from the monitoring phase to the charging phase occurs.

In Step 285, as briefly alluded to above, the first and second bits of the BSB2 parameter track which charging sub-phase the battery charging process is operating in. If both the first and second bits are equal to "0," the battery charging process is in a temporary idle phase. If the first and second bits are set to "01," "10" or "11", it indicates that the battery charging process is either in the initial charge sub-phase, the bulk charge sub-phase or the pulse maintenance charge sub-phase, respectively (Steps 286–288).

Figure 16:
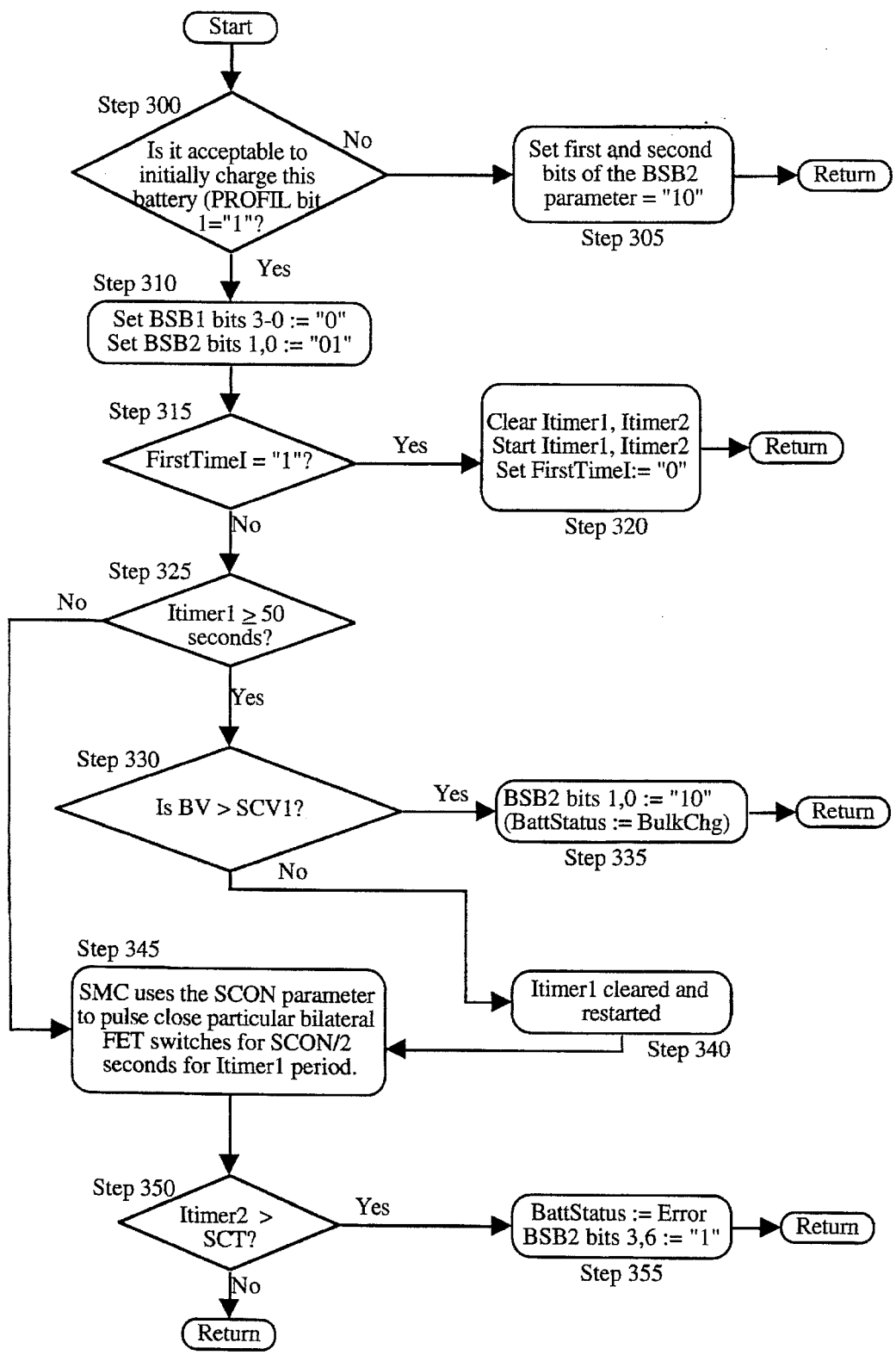
FIG. 16 is a flowchart of an initial charge sub-phase of the battery charging process.

Referring to FIG. 16, in the initial charging sub-phase (Step 300), the SMC first checks a status parameter in the EEPROM of the EMM (i.e., a "PROFIL" parameter) to determine whether the battery recommends performing this sub-phase as part of the charge process. The PROFIL parameter includes a plurality of bits, wherein each charging sub-phase is afforded a bit which, when inactive, represents that the particular charging sub-phase is to be bypassed. If a particular bit (i.e. bit 1) of the PROFIL parameter (corresponding to the initial charge sub-phase) is inactive, the battery charging process would immediately propagate to the Bulk Charge sub-phase after altering the first and second bits of BSB2 parameter accordingly (Step 305). If charging of the battery in the initial charge sub-phase is desired (i.e., bit 1 of the PROFIL parameter is set), then bits 0–3 of BSB1 parameter are cleared to "0" (Step 310) to clear out flag information which will be later used during bulk charge cycle in its charge termination procedure. Also, in step 310, bits 1,0 of the BSB2 parameter are set to "01" to enable and confirm performance of the initial charge sub-phase.

In Step 315, if a state variable associated with the initial charge sub-phase ("FirstTimeI") is set to indicate that this is a first pass through the initial charge sub-phase, two initial charge timers ("Itimer1 and Itimer2") are cleared and started and the FirstTimeI variable is cleared indicating that a previous pass through the initial charge sub-phase occurred (Step 320). The Itimer2 is used to signal an error if the battery voltage does not rise above the shorted cell voltage after a shorted cell threshold time ("SCT"), most likely due to a shorted battery cell as shown in Steps 350 and 355. In Step 325, the Itimer1 counts up to fifty seconds, which is a period between checks of a measured battery voltage ("BV") of Step 330.

If Itimer1 is greater than or equal to 50 seconds (i.e., finishes its time period), the SMC reads the measured battery voltage ("BV") from the EMM. The BV is a dynamic measurement for a string of battery cells in series. The SMC compares BV to a static shorted cell voltage parameter ("SCV1" or "SCV2," depending on whether the battery is being charged with 1.0 A or 1.5 A) stored within the EEPROM. For example, the SCV1 parameter is a threshold voltage of approximately 9 volts required by the battery in this embodiment of eight NiMH battery cells in series. This comparison is made to determine whether one of the battery cells of the battery has either shorted or degraded to determine if charging should be aborted for safety reasons. If BV>SCV1 (or SCV2), the battery is capable of being safely charged, allowing the battery charging process to enter the bulk charge sub-phase (Step 335). However, in the event that BV<SCV1 (or SCV2), there possibly exists a shorted or degraded battery cell in the battery. Thus, the Itimer1 is cleared and restarted (Step 340) and this check will be repeated as an operation of Step 345 is performed.

This operation of Step 345 is performed when Itimer1 is at the beginning its time period (immediately after Itimer1 is cleared and restarted). The SMC pulse closes particular bilateral FET switch(es) of the battery Switching circuit by applying a pulse of SCON/2 seconds in order to provide a small amount of power to the battery over a selected period of time (SCON is a parameter is stored in the EEPROM as listed in Appendix A). This small amount of power applied to the battery is part of the test which the SMC uses to continue checking the battery voltage. Note that the check of BV>SCV1 is performed as late as possible after pulse closing and opening of the particular bilateral FET switch (es) i.e. at end of each fifty second Itimer1 period. This is done to avoid confusing the voltage check with simultaneous energy input to battery, and allows some stabilization time.

Figure 17A:
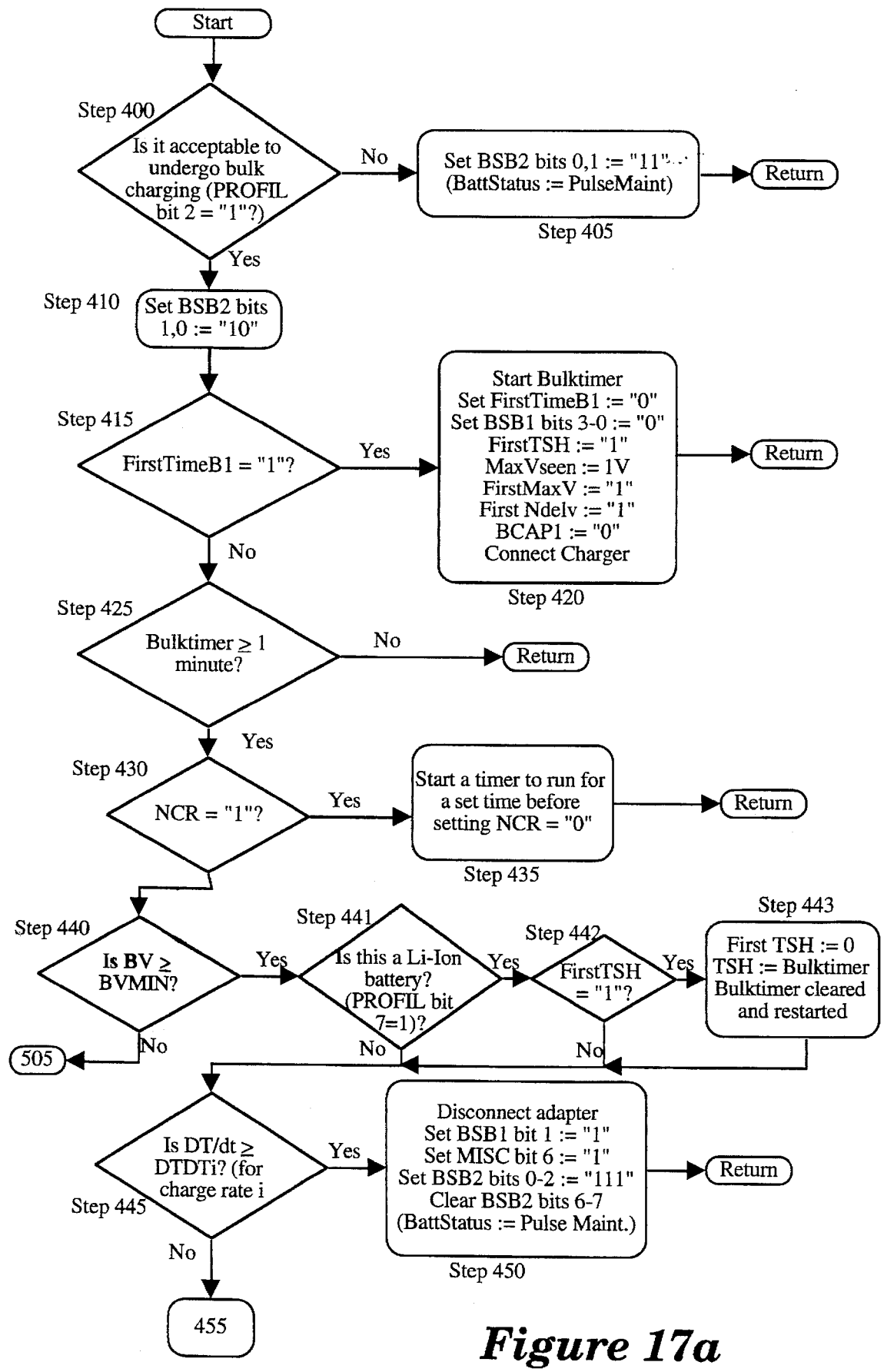
FIGS. 17a and 17b are flowcharts of the general operations of the bulk charge sub-phase of the battery charging phase.

Referring to FIG. 17a, a preferred flow of operations to be executed in the bulk charge sub-phase are as follows. In Step 400, a bit 2 of the PROFIL parameter is checked to determine whether performance of this phase is desirable. If bit 2 is not set, the first and second bits (bits 0,1) of the BSB2 parameter are set and the bulk charge phase returns to the battery charging process to commence the pulse maintenance charge sub-phase (Step 405). If bit 2 is set, the first and second bits of the BSB2 parameter are configured to enable performance of the bulk charge sub-phase (Step 410).

In Step 415, the bulk charge sub-phase checks whether a static variable associated with the bulk charge sub-phase ("FirstTimeB1") is set which indicates that its a first pass through the bulk charge sub-phase. If FirstTimeB1 is set, certain parameters are initialized, a bulk charge timer ("Bulktimer") is reset and started and the SMC activates certain switches to enable charging of the battery. Moreover, the SMC enables particular bilateral FET switches of the battery switching circuit so that the AC-to-DC adapter is electrically connected to the battery switching circuit. Thereafter, the bulk charge sub-phase returns to the battery charging process and will be used in the next cycle (Step 420). If FirstTimeB1 is not set, the Bulktimer is checked whether it has been running for at least one minute to allow for a transition period for the battery to achieve a steady state of charging and to attempt to remove a initial transient condition of applying charge to the battery (Step 425). If the Bulktimer has not been running for at least one minute, the bulk charge sub-phase returns to the top level battery charging process.

In Step 430, a check is done if the battery has been exposed to a new charge rate since undergoing a most previous bulk charge sub-phase. As discussed above, the AC-to-DC adapter transmits two power outputs having a constant current of 1.0 A and 1.5 A. In the event that the power output to the battery is switched from 1.0 A to 1.5 A or from 1.5 A to 1.0 A (i.e. a static variable "NCR" is "true" or active), an increment timer is started to run for a predetermined time period (e.g., two minutes) before the NCR variable is deactivated (Step 435). This time period ensures that the battery is settled before charging.

In Step 440, a check is done whether the battery voltage ("BV") is greater than a minimum threshold voltage ("BVMIN") before checking for the charge termination condition. This prevents premature termination of the charging of the battery. Assuming that BV is greater than or equal to BVMIN, the bulk charge sub-phase determines whether the battery is a Li-Ion battery by checking whether bit 7 of the PROFIL parameter is set (Step 441). This is done because the Li-Ion battery is charged to a predetermined voltage. This is calculated by initially setting a Time Shutoff parameter ("TSH") in the EMM module equal to a time value counted in the Bulktimer and clearing/restarting the Bulktimer so that when it counts up to the time value stored in the TSH parameter, charging is terminated to avoid overcharging of the Li-Ion battery (Steps 442 and 443). The SMC should only alter its own copy of the TSH parameter and later compare its copy of the TSH to the Bulktimer when checking for Li-Ion battery charge termination. Thereafter, the bulk charge sub-phase undergoes three charge termination checks. It is contemplated that any of these charge termination checks can be bypassed by setting its corresponding threshold parameter at a value greater than the capabilities of the battery.

A first charge termination check is whether a temperature gradient ("DT/dt") is greater than or equal to a temperature threshold parameter, indexed by a charge rate of 1.0 A or 1.5 A ("DTDT$_i$"). Such temperature gradient checking is used primarily for NiMH batteries. If DT/dt>DTDT$_i$, the battery is at 100% charge level (i.e. achieved a charge termination condition) so that the SMC performs a charge termination procedure; namely, (i) bit 2 of the BSB2 parameter is set to reflect that the charge termination condition has been achieved, (ii) the AC-to-DC adapter is disconnected from the battery switching circuit by disabling appropriate bilateral FET switches within the battery switching circuit, (iii) bits 0,1 of the BSB2 parameter are both set to reflect entering a pulse maintenance charging sub-phase, (iv) soft errors are cleared and (v) bit 1 of BSB1 parameter is set to indicate the termination condition, namely, that DT/dt was the check that yielded termination of bulk charging (Step 450). However, if DT/dt<DTDT$_i$, then the bulk charge sub-phase continues.

Figure 17B:
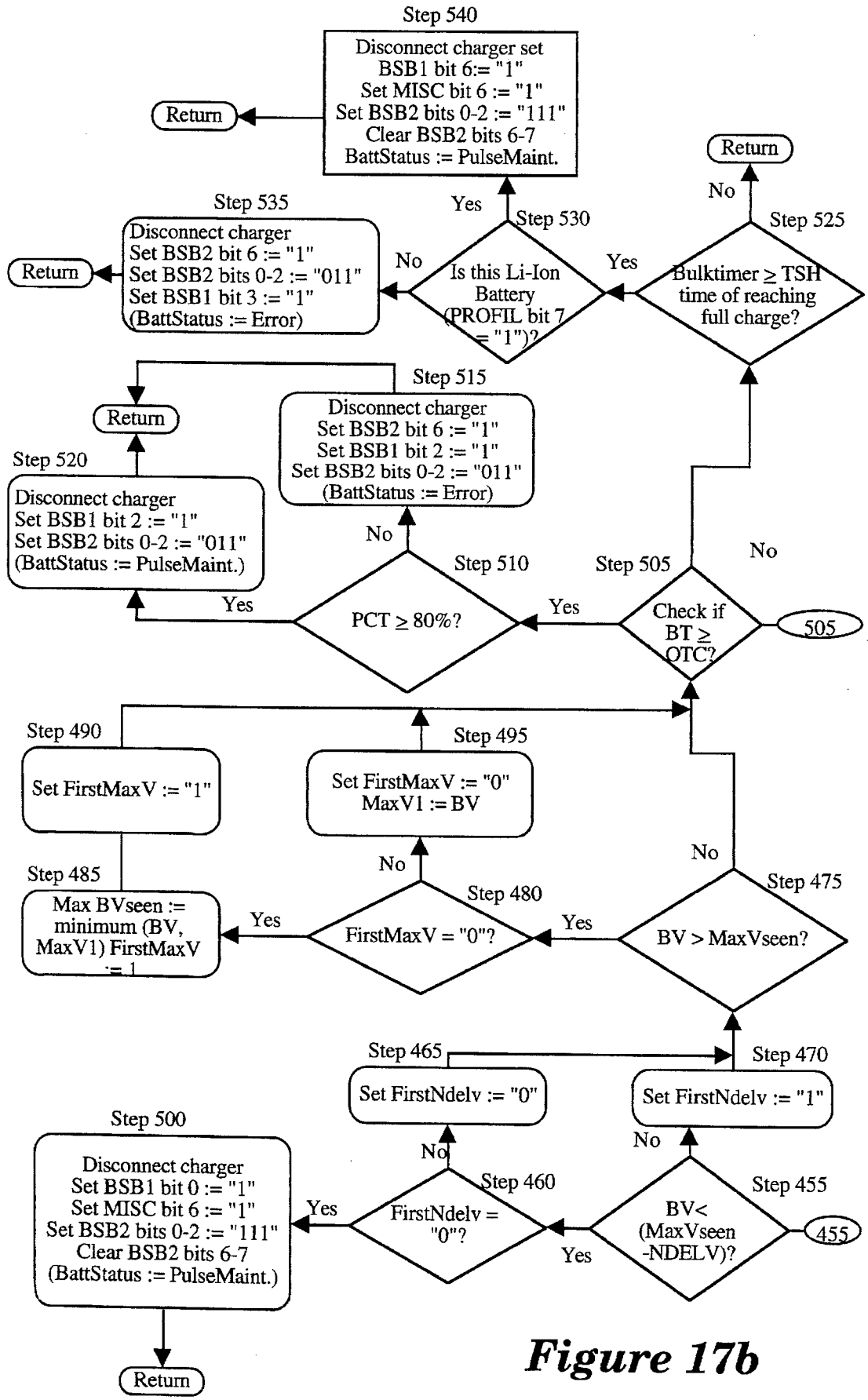

As shown in FIG. 17b, a second charge termination check is a negative voltage change determination to signal that Nickel batteries are fully charged. To accomplish this, a comparison is made between the battery voltage ("BV") and a maximum voltage previously detected in the battery (Step 455). Certain procedures are undergone to prevent an erroneous determination of the negative voltage change caused by a minor voltage dip or a transient condition, by requiring two sequential occurrences of a negative voltage change (Steps 460–495). In the event that two negative voltage changes occur in succession, the battery has achieved its charge termination condition and performs a charge termination procedure as shown in Step 500 which is identical to that charge termination procedure shown in Step 450, except a different bit of the BSB1 parameter is set.

A third charge termination is whether a battery temperature ("BT") is greater than or equal to an over-temperature check ("OTC") whose value is stored in a threshold parameter contained in the EEPROM (Step 505). Assuming that BT≧OTC, another comparison is conducted to check whether the percentage of battery capacity is greater than or equal to 80% (Step 510). It is common for the battery to heat up as it approaches its 100% charge level, but if the battery temperature is equal to or exceeds the OTC value before achieving 80% charge level, it generally indicates that there is a problem with the battery. Thus, charging is terminated with an error condition in this case (Step 515). If, however, the battery exceeds 80% charge level after obtaining a temperature of OTC, the SMC performs a simplified charge termination procedure with an important exception of not setting either bit 6 of a MISC parameter or bit 2 of the BSB2 parameter because the charge termination energy level is not realized (Step 520).

Assuming that BT<OTC, the Bulktimer is checked to see if it has been running for a time period normally sufficient for the battery to be fully charged (Step 525). If it has reached the time period and the battery is not a Li-Ion battery (Step 530), an error condition is activated and the charging is terminated (Step 535). This is done to avoid overcharging and the harmful effects associated therewith. Otherwise, the bulk charge sub-phase returns to the battery charging process and will be continued in a next cycle. If a Li-Ion battery is being charged, the first half of the charge termination criteria is met at Step 440 and the Bulktimer will be restarted after its time value is stored in the SMC's copy of the TSH parameter. Then, when the Bulktimer counts up to this value stored in the SMC's copy of the TSH parameter, it passes from Step 525 to Steps 530 and 540, terminating charge properly for a Li-Ion battery.

Figure 18:
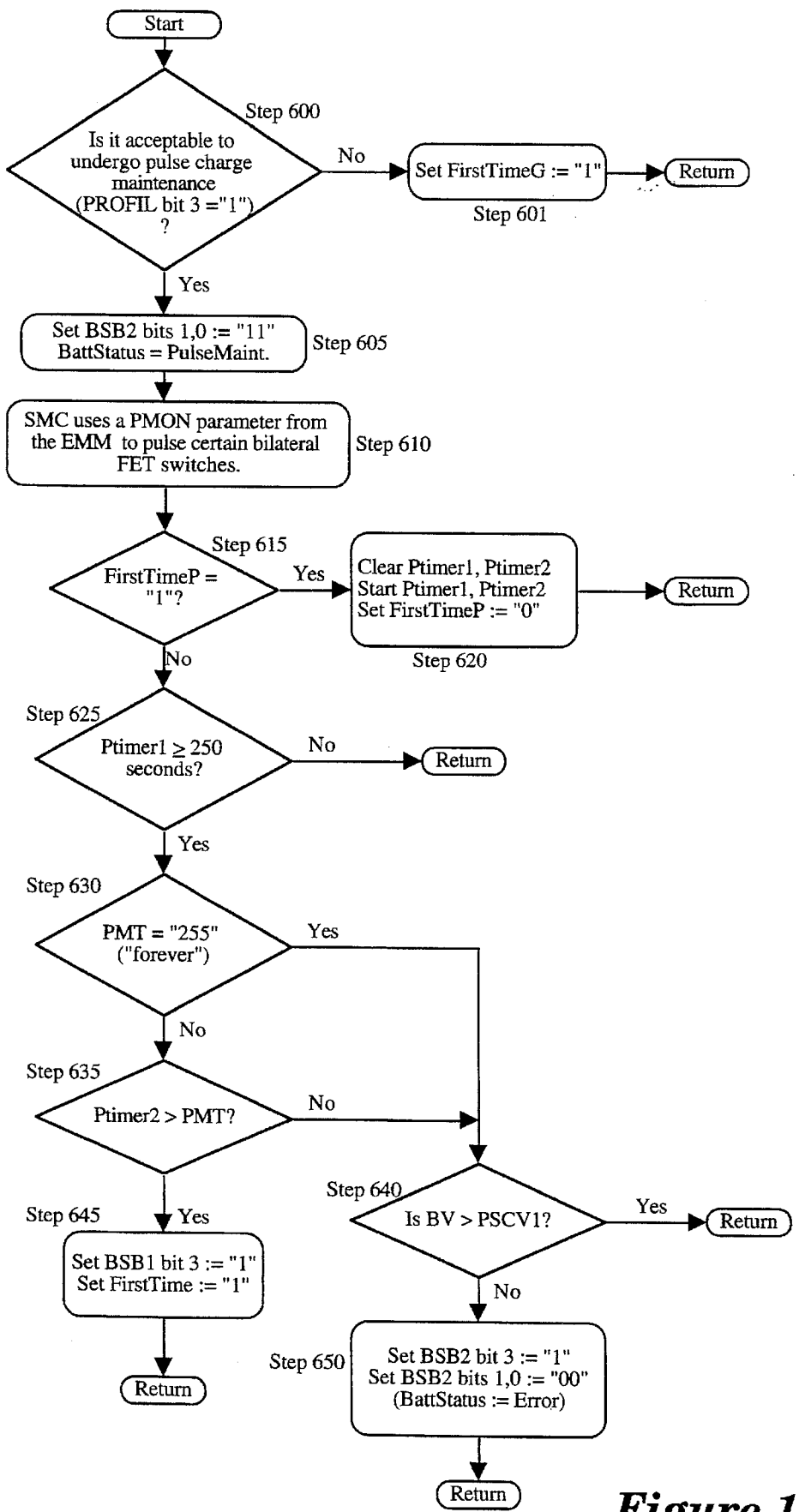
FIG. 18 is a flowchart of the pulse maintenance charge sub-phase of the battery charging phase.

Referring to FIG. 18, the final phase is the pulse maintenance charge sub-phase which maintains the battery at a maximum energy level and checks for shortages in the battery cells normally comprising the battery.

In Step 600, the SMC, performing the pulse maintenance sub-phase of the battery changing process, checks whether bit 3 of the PROFIL parameter is set to determine whether this sub-phase is desired. If bit 3 is not set, the FirstTimeG variable is set so that upon returning to the monitoring phase in a subsequent cycle, the SMC determines how much energy remains in the battery before proceeding to a charging sub-phase (Step 601). Thereafter, the pulse maintenance charge sub-phase returns to the top level battery charging process. However, if bit 3 is set, the first and second bits (bit 0,1) of the BSB2 parameter are set as shown in Step 605. The SMC uses a parameter "PMON" to pulse certain bilateral switches to allow a limited amount of power to charge the battery (Step 610). This sub-phase is nearly identical in structure to FIG. 15, the initial charge sub-phase. Although the parameters and periods are different, the voltage threshold check "BV>PSCV1" (discussed below) is done in the same manner at the end of the period as late as possible after the current pulse applied for PMON/2 seconds (which was applied at the beginning of 250 second cycle).

Thereafter, the SMC checks whether this is a first pass through the pulse maintenance charge sub-phase i.e. whether a static variable "FirstTimeP" is set (Step 615). If so, two pulse timers ("Ptimer1" and "Ptimer2") are started and the FirstTimeP variable is cleared indicating to subsequent cycles that a first pass has already occurred (Step 620).

Next, in Step 625, the Ptimer1 is checked to determine if it has been running for longer than the pulse duty cycle period of time (e.g. 250 seconds to allow maximum settling time before check BV>PSCV1 is performed. If not, this sub-phase returns to the top-level battery charging process. In steps 630–640, the pulse maintenance charge sub-phase checks whether the battery voltage ("BV") is greater than a post bulk-charge phase shorted cell test pass voltage threshold ("PSCVf"). This sub-phase maintains the battery at its charge termination energy level for a period of time equal to the pulse maintenance time-out ("PMT") parameter (1<PMT<254 minutes). If PMT=255, the pulse maintenance charge process can be maintained indefinitely unless the AC-to-DC adapter is disconnected. The shorted cell voltage check is repeatedly performed in this sub-phase to catch a condition of a defective cell for purposes of later notifying the user. The battery voltage should never fall below PSCV1 in this sub-phase. If Ptimer2 exceeds PMT, then BSB1 bit 3 is set to indicate that this time-out was reached. Also, the variable FirstTimeG is set to prevent recharging until PCT<PREQ in Step 260 of FIG. 15.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, references to details of the preferred embodiment are not intended to limit the scope of the claims which in themselves recite only those features regarded as essential to the invention.

APPENDIX A

Battery Parameter EEPROM List (battery specific) (256 bytes)

| Parameter Description | EEPROM Addr. | Acronym | Notes |
|---|---|---|---|
| $-\Delta V$ cutoff (total for all cells) (negative delta-V threshold) | (00) | NDELV | (BSB1 steps) |
| dT/dt cutoff (units of 0.125° C./min.) (positive delta threshold) (Given at IMAXC, IMINC, resp.) | (01–02) | DTDTi | |
| Over Temp. Cutoff (in 0.5° C.) | (03) | OTC | (in 0.5° C.) |
| Timer shutoff to avoid overcharging expressed in 8 minute steps | (04) | TSH | |
| Max. Allowable Charge Current | (05) | IMAXC | (BISCL steps) |
| Min. Allowable Charge Current | (06) | IMINC | (BISCL steps) |
| Max. Allowable Charge Voltage | (07) | VMAXC | (.125 V steps) |
| Min. Allowable Charge Voltage | (08) | VMINC | (.125 V steps) |
| Battery Charge Profile | (09) | PROFIL | (see below) |
| Minimum Temp. for Charging | (0A) | TMIN | (in 0.5° C.) |
| Maximum Temp. for Charging | (0B) | TMAX | (in 0.5° C.) |
| Shorted Cell Test Pass Voltage Threshold of entire series string of cells. (measured during low time of PWM cycle of IMAX rate) | (0C) | SCV2 | (BVS1 steps) |
| Shorted Cell Test Pulse ON Time (minimum) recomm. for equiv. avg. current PWM Overall period is fixed at 50 seconds. | (0D) | SCON | (1 sec. steps) |
| Shorted Cell Test Duration (maximum) | (0E) | SCT | (in minutes) |
| Shorted Cell Test Pass Voltage Threshold of entire series string of cells. (measured during low time of PWM cycle of IMIN rate) | (0F) | SCTV1 | (BVS1 steps) |
| Post Bulk-Charge Shorted Cell Test Pass Voltage (series string) Threshold of entire series string of cells. (measured during low time of PWM cycle of IMIN rate) | (10) | PSCV1 | (BVS1 steps) (e.g., 90 hex) |
| Battery Voltage Minimum before charge termination is checked (except timeout TSH) when using IMAX rate. | (11) | BVMIN2 | (BVS1 steps) |
| Pulse Maint. ON Time (min) recomm. for equiv. avg. current w/ duty cycle Overall period is fixed at 250 seconds. | (12) | PMON | (1 sec. steps) |
| Pulse Maint. Timeout (minutes) (254 minutes max., 255 = "forever") | (13) | PMT | |
| Battery Percent of Charge below which bulk charge will be requested from host | (14) | PREQ | (½% steps) (see PCT too) |
| Battery Voltage Minimum before charge termination is checked (except timeout TSH) when using IMAX rate. | (15) | BVMIN1 | (BVS1 steps) |
| Battery Status Byte1 | (16) | BSB1 | (see below) |
| Voltage at End of Discharge (EOD) (for entire series string of cells) | (17) | VDIS | (BVS1 steps) |
| Total Discharge Cycle Count = 256 * (byte 24) + (byte 25) | (18, 19) | CYCLi | |
| BV1 mV / A:D step (in mV) | (1A) | BVS1 | (see BV1) |
| BI mA / A:D step (charge) | (1B) | BISCL | (in .125 mA) |
| BI mA / A:D step (discharge) | (1C) | BISDL | (in .125 mA) |
| Reserved for other use | (1D-FF) | | |

The following are RAM locations accessible by the host. Only some of this RAM data will be written to by the host, as indicated below. The EMM coordinates all accesses to EEPROM and RAM. Each of the following bytes indicates whether the host has READ ONLY access or READ/WRITE access.

| Parameter Description | RAM Addr. | Acronym | Notes |
|---|---|---|---|
| Percentage of Full Charge (½% per unit) for battery capacity currently available. | (00) | PCT | (READ only) |
| Battery Current Instantaneous (in BISxx mA steps) (see MISC byte below for sign bit) | (01) | BI | (READ only) |
| Battery Voltage (in BVS1 steps) | (02) | BV | (READ only) |
| Battery Temperature (in 0.5° C.) (Readings below 0° C. are "0", readings above 70° C. are "140." | (03) | BTEMP | (READ only) |
| Battery Capacity Currently Avail. (in omAh = 8 mAh steps) | (04) | BCAP | (READ only) |
| Misc. Status Bits (see below) | (05) | MISC | (RD/WR) |
| Battery Status Byte2 (see below) | (06) | BSB2 | (RD/WR) |
| Reserved for other use | (07-FF) | | |

APPENDIX A-continued

| Bit | Comments |
|---|---|
| | Battery Charge (PROFIL) . . . (EEPROM location 0B): |
| 0 | 0 = Not Rechargeable, 1 = Rechargeable |
| 1 | 0 = Skip Initial Charge Phase, 1 = Do Initial Phase |
| 2 | 0 = Skip Bulk Charge Phase, 1 = Do Bulk Phase |
| 3 | 0 = Skip Pulse Maint. Charge Phase, 1 = Don't skip. |
| 4 | 0 = Don't Use Constant Voltage Charging, 1 = Use it. |
| 5 | 0 = Don't Use Constant Current Charging, 1 = Use it. |
| 6 | reserved |
| 7 | 0 = Not Li-Ion type battery<br>1 = Li-Ion type battery |
| | Battery Status Byte1 (BSB1) . . . (EEPROM location 18): |
| 0 | dV/dt Cutoff Notification (0 indicates conditions normal or reset, 1 indicates dV/dt achieved) |
| 1 | dV/dt Cutoff Notification (0 indicates conditions) normal or reset, 1 indicates dT/dt achieved) |
| 2 | OTC (over temperature) Cutoff Notification (0 indicates conditions are normal or reset, 1 indicates maximum temperature cutoff point achieved) |
| 3 | Timer Cutoff Notification (0 indicates conditions normal or reset, 1 indicates max. time achieved). |
| 4 | Request calibration (0 indicates no request for calibration, 1 indicates calibration request) |
| 5 | Calibration Status (0 indicates calibration not completed, 1 indicates calibration completed) |
| 6 | Li-Ion Battery Timer Cutoff Notification |
| 7 | Reserved for future use |
| | Battery Status Byte2 (BSB2) . . . (RAM location 0B): |
| 1, 0 | Charge Phase (00 indicates idle 01 = initial charge phase, 10 = bulk charge phase, 11 = pulse maint. charge phase). Note: initial and pulse maint. phases do pulsed charging). Host repeatedly sets these bits during charging (once a second), and maintains an image of this byte status itself. The EMM clears these bits to the idle status once every 8 seconds. |
| 2 | 1 = Charge Termination achieved: (Set/cleared by host) EMM should clear its discharge counters when it sees this bit do a low to high transition. The host clears this bit during the charging process and sets it when charge termination achieved. |
| 3 | 1 = Stop Charging (error, failed shorted/defective cell test) This bit starts at 0 in RAM. EMM never resets this bit once set. (Host sets/clears this bit). |
| 4 | 1 = Stop Charging (other error) This bit starts at 0 in RAM. EMM never resets this bit once set. (Host sets/clears this bit). |
| 5 | 1 = Stop Charging (error, dead batt: capactiy below BDED) This bit starts at 0 in RAM. EMM never resets this bit once set. (Host sets/clears this bit). |
| 6 | 1 = Error, charger timer count or OTC exceeded. This bit starts at 0 in RAM. EMM never resets this bit once set, although host may set or clear it. |
| 6 | 1 = Error, charger timer count or OTC exceeded previously. This bit starts at 0 in RAM. EMM never resets this bit once set, although host may set or clear it. |
| | Misc. Status Bits (MISC) . . . (RAM location 0A): |
| 0 | 1 = EOD (end of discharge) reached. This bit is set and cleared by EMM. |
| 1–5 | Reserved |
| 6 | 1 = Fully Charged Battery (100%) achieved. (host sets this bit, EMM clears this bit). |
| 7 | 0 = Positive Current Polarity for B1 (Discharging)<br>1 = Negative Current Polarity for B1 (Charging) |

What is claimed is:

1. A circuit for at least supplying power to a plurality of components through a main power line within a computer system, said circuit comprising:

a first battery selectively chosen to sequentially discharge its power to said plurality of components through a first battery power output line, and alternatively, to receive power to charge said first battery from a first battery power input line;

a second battery selectively chosen to sequentially discharge power to said plurality of components through a second battery power output line, and alternatively, to receive power to charge said second battery from a second battery power input line;

a first switch; and a first power line selectively coupled to one of the main power line, said first battery power output line and said second battery power output line by enabling at least said first switch, said first power output line provides power to said plurality of components when coupled thereto, charges said first battery when coupled to said first battery power output line, and alternatively charges said second battery when coupled to said second battery power output line.

2. The circuit according to claim 1 further comprising:

a second switch selectively connecting said first battery to said first battery input line;

a third switch selectively connecting said first battery to said first battery output line;

a fourth switch selectively connecting said second battery to said second battery input line; and a fifth switch selectively connecting said second battery to said second battery output line.

3. The circuit according to claim 2, wherein said first battery sequentially discharges power to said plurality of components if said third switch is enabled and at least said first and fifth switches are disabled, and alternatively, said second battery sequentially discharges power to said plurality of components if said fifth switch is enabled and at least said first and third switches are disabled.

4. The circuit according to claim 2, wherein each of said first through fifth switches is a bilateral FET switch includes a first and second field effect transistor ("FET") switches in series, said first FET switch is oriented in a direction opposite said second FET switch, wherein said first and second FET switches share a common control signal to enable and disable said first switch.

5. The circuit according to 1, wherein said first and second batteries being of a group consisting of Nickel Cadmium, Nickel Metal Hydride and Lithium-Ion batteries.

6. The circuit according to claim 2, wherein said first and second battery input lines are coupled to a second power line, said first and second power lines are coupled correspondingly to a first and second adapter power lines of a power adapter, said power adapter transmitting a first power output through said first adapter power line and a second power output through said second adapter power line.

7. The circuit according to claim 6, wherein said circuit allows said power adapter to supply power to said plurality of components while simultaneously charging said first battery provided said first and second switches are enabled and said third, fourth and fifth switches are disabled.

8. The circuit according to claim 6, wherein said power adapter supplies power to said plurality of components through said main power line while simultaneously charging said second battery, provided said first and fourth switches are enabled and said second, third and fifth switches are disabled.

9. The circuit according to claim 6, wherein said first and second batteries are simultaneously charged by said power adapter, provided said first, second and fifth switches are enabled so that said first power output from said power adapter charges to said second battery and said second power output charges said first battery.

10. The circuit according to claim 6, wherein said first and second batteries are simultaneously charged by said power adapter, provided said first, third and fourth switches are enabled so that said first power output from said power adapter charges said first battery and said second power output charges said second battery.

11. The circuit according to claim 6, wherein said first battery is charged by said first and second power outputs from said power adapter, provided said first, second and third switches are enabled.

12. The circuit according to claim 6, wherein said second battery is charged by said first and second power outputs of said power adapter, provided said first, fourth and fifth switches are enabled.

13. The circuit according to claim 6, wherein said first battery is forced to discharge power to said plurality of components, provided only said fourth switch is enabled.

14. The circuit according to claim 1, wherein said first power line is coupled to a cable line of a power adapter, said power adapter generating an unregulated power output and transmitting said unregulated power output through said cable line and said first power line in order to supply power to said plurality of components, wherein said first switch is enabled to allow said unregulated power output to be transmitted through the main power line while at least said third and fifth switches are disable to preclude transmission of said unregulated power output into said first battery and said second battery, respectively.

15. A computer system comprising:

a bus;

a central processing unit ("CPU") coupled to said bus, said CPU processing data and program instructions;

a memory unit coupled to said bus; said memory unit contains said data and said program instructions;

a plurality of battery packs, wherein a first battery pack of said plurality of battery packs includes a first battery selectively chosen to supply power to a load being at least one of said CPU and said memory unit or to receive power to charge said first battery, and a second battery pack includes a second battery selectively chosen to supply power to said load or to receive power to charge said second battery;

a battery switching circuit including
a first power line, and
at least a first switch selectively coupling said first power line to one of said load, said first battery and said second battery in order to selectively provide power to said load, to charge said first battery, and alternatively, to charge said second battery; and a micro-controller unit coupled to said battery switching circuit, said micro-controller unit controls said battery switching circuit.

16. The computer system according to claim 15, wherein said battery switching circuit further comprising:

a second switch selectively connecting said first battery to a first battery input line;

a third switch selectively connecting said first battery to a first battery output line;

a fourth switch selectively connecting said second battery to a second battery input line; and a fifth switch selectively connecting said second battery to a second battery output line.

17. The computer system according to claim 16, wherein said first and second battery input lines of said battery switching circuit are coupled to a second power line, wherein said first and second power lines are coupled correspondingly to a first and second adapter power lines of a power adapter, said power adapter transmitting a first power output through said first adapter power line and a second power output through said second adapter power line.

18. The computer system according to claim 17, wherein said first and second batteries are simultaneously charged by said power adapter, provided said first, second and fifth switches are enabled so that said first power output from said power adapter charges to said second battery and said second power output charges said first battery.

19. The computer system according to claim 17, wherein said first and second batteries are simultaneously charged by said power adapter, provided said first, third and fourth switches are enabled so that said first power output from said power adapter charges said first battery and said second power output charges said second battery.

20. The computer system according to claim 17, wherein said first battery is charged by said first and second power outputs from said power adapter, provided said first, second and third switches are enabled.

21. The computer system according to claim 17, wherein said second battery is charged by said first and second power outputs of said power adapter, provided said first, fourth and fifth switches are enabled.

22. The computer system according to claim 17, wherein said first battery is forced to discharge power to at least said are, provided only said fourth switch is enabled.

23. The computer system according to claim 16, wherein said first power line is coupled to a cable line of a power adapter, said power adapter generating an unregulated power output and transmitting said unregulated power output through said cable line coupled to said first power line in order to supply power to said plurality of components, wherein said first switch is enabled to allow said unregulated power output to be transmitted to said plurality of components while at least said third and fifth switches are disable to preclude transmission of said unregulated power output into said first battery and said second battery, respectively.

24. The computer system according to claim 15, wherein at least one of said first and second battery packs further includes monitoring circuitry to measure certain characteristics of at least one battery of said first and second batteries and a first module to provide characteristics of said one battery to said micro-controller unit.

25. The computer system according to claim 24, wherein said first module includes a first memory element that contains information about said one battery and an internal micro-controller including a second memory element that contains instruction code to obtain information related to a power level of said one battery and a third memory element for storing program data and dynamic information.

26. A method for controlling discharging and charging of a first and second batteries, coupled to a battery switching circuit within a computer system, by a micro-controller unit coupled to a first and second power lines of said battery switching circuit through a pair of sensing lines, said method comprising the steps of:

sensing whether a DC power output is being supplied to at least said first power line, wherein if said DC power output is being supplied to said at least first power line, sensing whether a second DC power output is being supplied to said second power line, wherein enabling a plurality of electronic components to receive said DC power output while preventing said first and second batteries from being accessible to said DC power output, if said second DC power output is not supplied to said second power line, determining whether said computer system is in a high power mode if said second DC power output is supplied to said second power line, wherein if said computer system is in said high power mode, ensuring that said DC power output is supplied to said plurality of electronic components, determining whether said first battery is fully charged, wherein if said first battery is not fully charged, said second DC power output is supplied to said first battery until said first battery is fully charged, and determining whether said second battery is fully charged, wherein if said second battery is not fully charged, said second DC power output is supplied to said second battery until said second battery is fully charged, and if said computer system is not in said high power mode, determining whether both said first battery is fully charged, wherein if both said first and second batteries are not fully charged, simultaneously charging said first and second batteries, if said first battery is fully charged and said second battery is not fully charged, charging said second battery with said second DC output until completion, and if said first battery is fully charged and said second battery is not fully charged, charging said second battery with said DC output and said second DC output until completion.

27. The method according to claim 26, wherein if the DC power output is being supplied to both the first and second power lines, the computer system is not in the high power mode and the first battery is fully charged and the second battery is not fully charged, said method further comprising the step of:

determining whether it is desirable to charge said second battery at a fast battery charging rate prior to charging said second battery with said second DC output, wherein if it is desirable to charge said second battery at said fast battery charging rate, said second battery is charged with said DC power output and said second DC power output until completion.

28. The method according to claim 27, wherein if the DC power output is being supplied to both the first and second power lines, the computer system is not in the high power mode and the first battery is not fully charged and the second battery is fully charged, said method further comprising the step of:

determining whether it is desirable to charge said first battery at said fast battery charging rate prior to charging said first battery with said second DC output, wherein if it is desirable to charge said first battery at said fast battery charging rate, said first battery is charged with said DC power output and said second DC power output until completion.

29. The method according to claim 26, wherein if the DC power output is not being supplied to the first power line, said method further comprising the steps of:

determining whether said second battery is storing a sufficient amount of power to operate said computer system in said high power mode, and if so, enabling said second battery to discharge power to said at least one of said plurality of components;

determining whether said first battery is storing said sufficient amount of power to operate said computer system in said high power mode, and if so, enabling said first battery to discharge power to said at least one of said plurality of components; and placing said computer system in a lower power mode if neither said first and second batteries are storing said sufficient amount of power to operate said computer system in said high power mode.

30. A method for controlling discharging and charging of a first and second batteries, coupled to a battery switching circuit within a computer system, by a micro-controller unit coupled to a first and second power lines of said battery switching circuit through a pair of sensing lines, said method comprising the steps of:

sensing whether a DC power output is being supplied to said first power line, wherein (i) if said DC power output is not being supplied to said power line, determining whether said second battery is storing a sufficient amount of power to operate said computer system in a high power mode, wherein if so, said micro-controller unit enabling said second battery to discharge power to said at least one of said plurality of components, determining whether said first battery is storing a sufficient amount of power to operate said computer system in a high power mode, wherein if so, said micro-controller unit enabling said first battery to discharge power to said at least one of said plurality of components, placing said computer system in a lower power mode if neither said first and second batteries are storing a sufficient amount of power to operate said computer system in said high power mode, and (ii) if said DC power output is being supplied to said at least first power line, sensing by said micro-controller unit whether a second DC power output is being supplied to said second power line, wherein enabling said plurality of electronic components to receive said DC power output while preventing said first and second batteries from being charged with said DC power output, if said second DC power output is not being supplied to said second power line, and determining whether said computer system is in said high power mode if said second DC power output is supplied to said second power line, wherein if said computer system is in said high power mode, ensuring that said DC power output is supplied to said plurality of electronic components, determining whether said first battery is fully charged, wherein if said first battery is not fully charged, said second DC power output is supplied to said first battery until said first battery is fully charged, and determining whether said second battery is fully charged, wherein if said second battery is not fully charged, said second DC power output is supplied to said second battery until said second battery is fully charged, if said computer system is not in said high power mode, determining whether both said first battery is fully charged, wherein if both said first and second batteries are not fully charged, said first and second batteries are simultaneously charged, if said first battery is fully charged and said second battery is not fully charged and a fast battery charge rate is not desired, charging said second battery with said second DC output until completion, if said first battery is fully charged and said second battery is not fully charged and said fast battery charge rate is desired, charging said second battery with said DC output and said second DC output until completion, if said first battery is not fully charged and said second battery is fully charged and said fast battery charge rate is not desired, charging said first battery with said second DC output until completion, and if said first battery is not fully charged and said second battery is fully charged and said fast battery charge rate is desired, charging said first battery with said DC output and said second DC output until completion.

31. For a computer system comprising a micro-controller unit and a plurality of battery packs wherein each of said plurality of battery packs including a battery, monitoring circuitry of said battery to measure and calculate particular characteristics of said battery and a module to store and transmit said particular characteristics of said battery to said micro-controller unit to assist said micro-controller unit in independently charging said battery, a method comprising the steps of:

performing a monitoring operation to determine whether said battery requires charging by a power source;

performing a charging operation on said battery in the event that said battery requires charging; and performing an error detection to determine operation if an error occurs in performing one of said monitoring operation or said charging operation.

32. The method according to claim 31, wherein said charging operation includes the steps of:

checking whether it is desirable for said battery to undergo an initial charge operation to ascertain whether said battery is shorted, and if so, performing said initial charge operation;

checking whether it is desirable for said battery to undergo a bulk charge operation, and if so, performing said bulk charging operation to charge said battery until detection of a charge termination condition; and checking whether it is desirable for said battery to undergo a pulse maintenance charge operation to maintain said battery at an energy level.

33. The method according to claim 32, wherein said initial charge operation comprising the steps of:

(i) comparing a measured voltage of said battery to a static shorted cell voltage, wherein said battery is suspected to be shorted if said measured voltage is less than said shorted cell voltage; and (ii) continuously applying a predetermined amount of power to said battery if said measured voltage is less than said shorted cell voltage to verify whether said battery is shorted, wherein said battery is determined to be shorted if said measured voltage of said battery fails to rise above said static shorted cell voltage before a prescribed period of time.

34. The method according to claim 33, wherein said bulk charge operation comprising the steps of:

(i) enabling a connection between said power source and said battery so that said power source is able to charge said battery; and (ii) comparing said measured voltage of said battery to a minimum threshold voltage to determine whether to bypass a plurality of charge termination checks, wherein if said measured voltage of said battery is less than said minimum threshold voltage, said plurality of charge termination checks are bypassed, wherein said bulk charging operation terminates if a temperature of said battery is at least equal to a predetermined temperature, and alternatively if said measured voltage of said battery is at least equal to said minimum threshold voltage, said plurality of charge termination checks are performed by said micro-controller unit, wherein said bulk charging operation is terminated if one of said plurality of charge termination checks indicates that said battery is experiencing a charge termination condition corresponding to said one of said plurality of charge termination checks.

35. The method according to claim 34, wherein said monitoring operation comprising the steps of:

determining whether said battery is coupled to said computer system;

verifying that said power source for charging said battery is powered thereby having an ability to charge power said battery;

determining whether said monitoring operation has been performed in a prior cycle, wherein if said monitoring operation has not been performed in said prior cycle, said micro-controller unit performing the following steps:

comparing a value of a percentage of charge capacity remaining in said battery as measured by said monitoring circuit to a value of a threshold percentage of charge capacity, and determining whether a temperature of said battery is between a maximum threshold temperature and a minimum threshold temperature to ensure charging of said battery at an appropriate battery temperature, provided said percentage of charge capacity remaining in said battery is less than said threshold percentage of charge capacity.

* * * * *